US012581517B2

(12) United States Patent
Li et al.

(10) Patent No.: US 12,581,517 B2
(45) Date of Patent: Mar. 17, 2026

(54) SIDELINK RESOURCE SELECTION BASED ON CONTROL INFORMATION

(71) Applicant: HUAWEI TECHNOLOGIES CO., LTD., Shenzhen (CN)

(72) Inventors: Xiangyu Li, Shanghai (CN); Wenjie Peng, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 344 days.

(21) Appl. No.: 18/304,080

(22) Filed: Apr. 20, 2023

(65) Prior Publication Data

US 2023/0309125 A1 Sep. 28, 2023

Related U.S. Application Data

(63) Continuation of application No. PCT/CN2020/123010, filed on Oct. 22, 2020.

(51) Int. Cl.
*H04W 72/40* (2023.01)
*H04W 72/1263* (2023.01)
*H04W 88/06* (2009.01)

(52) U.S. Cl.
CPC ....... *H04W 72/40* (2023.01); *H04W 72/1263* (2013.01); *H04W 88/06* (2013.01)

(58) Field of Classification Search
CPC . H04W 72/40; H04W 72/1263; H04W 88/06; H04W 4/40; H04W 72/25;

(Continued)

(56) References Cited

U.S. PATENT DOCUMENTS

2019/0313379 A1 10/2019 Lee et al.
2022/0116996 A1* 4/2022 Lee .................. H04W 74/0816
(Continued)

FOREIGN PATENT DOCUMENTS

CN 110167074 A 8/2019
CN 111800872 A 10/2020
(Continued)

OTHER PUBLICATIONS

LG Electronics, "Discussion on resource allocation mechanism for NR V2X,", 3GPP TSG RAN WG1 Meeting #95, R1-1812844, Spokane, USA, Nov. 12-16, 2018; 12 pages.
(Continued)

*Primary Examiner* — Rushil P. Sampat
(74) *Attorney, Agent, or Firm* — Rimon PC

(57) ABSTRACT

Embodiments of this application provide a wireless communication method and a related apparatus and system. The method includes obtaining mode information of a second terminal device. The mode information indicates a resource scheduling manner of the second terminal device. The method also includes sending assistance information to the second terminal device based on the mode information. The assistance information indicates one or more sets of sidelink transmission resources. Based on this solution, it can reduce resource conflicts or resource wastes, and therefore can properly and effectively allocate the sidelink transmission resource. In this way, sidelink communication efficiency can be improved.

16 Claims, 4 Drawing Sheets

Network device

Uu          Uu

SL transmission

First terminal device     Second terminal device

(58) Field of Classification Search
CPC ......... H04W 4/46; H04W 4/70; H04W 72/20;
H04W 76/14; H04L 5/0053
See application file for complete search history.

(56) References Cited

U.S. PATENT DOCUMENTS

| | | | |
|---|---|---|---|
| 2022/0217575 A1 * | 7/2022 | Wang ................ | H04W 28/0268 |
| 2024/0023138 A1 * | 1/2024 | Zhao ..................... | H04L 5/0053 |

FOREIGN PATENT DOCUMENTS

| | | | |
|---|---|---|---|
| WO | 2020033628 A1 | 2/2020 | |
| WO | WO 2022082382 A1 * | 4/2022 | |

OTHER PUBLICATIONS

CMCC, "Un-based sidelink resource allocation/configuration," 3GPP TSG RAN WG1 Meeting #95, R1-1812881, Spokane, USA, Nov. 12-16, 2018; 7 pages.
ZTE, "Considerations for latency reduction," 3GPP TSG RAN WG2 Meeting #99bis, R2-1711015, Prague, Czech Republic, Oct. 9-13, 2017; 3 pages.
3GPP TS 38.321 V16.2.1 (Sep. 2020); 3rd Generation Partnership Project; Technical Specification Group Radio Access Network; NR; Medium Access Control (MAC) protocol specification (Release 16); 154 pages.
3GPP TS 38.331 v16.2.0 (Sep. 2020); 3rd Generation Partnership Project; Technical Specification Group Radio Access Network; NR; Radio Resource Control (RRC) protocol specification (Release 16); 921 pages.

* cited by examiner 910    920

900

Transceiver unit

Processing unit

1010

Processor

Memory

Interface 1020    1030

SIDELINK RESOURCE SELECTION BASED ON CONTROL INFORMATION

CROSS-REFERENCE TO RELATED APPLICATIONS

This application is a continuation of International Application No. PCT/CN2020/123010, filed on Oct. 22, 2020, the disclosure of which is hereby incorporated by reference in its entirety.

TECHNICAL FIELD

Embodiments of this application generally relate to the field of communication technologies, and in particular, to a wireless communication method, an apparatus, and a system.

BACKGROUND

In a wireless communication system, data communication between terminal devices may be performed through a network device, or communication between terminal devices may not be directly performed through a network device. An interface between terminal devices is referred to as a PC5 interface, which is similar to a Uu interface between a terminal device and a network device. A link between terminal devices is referred to as a sidelink (SL).

A typical application scenario of sidelink communication is performed in vehicle-to-everything (V2X) communication system. In the vehicle-to-everything communication system, a vehicle or a road side unit (RSU) is a terminal device, and data transmission between terminal devices may be directly performed through a sidelink but not through a network device. In this way, a communication delay can be effectively reduced. FIG. 1 is a schematic diagram of direct communication between terminal devices through a PC5 interface.

Before communication between terminal devices is performed, a sidelink transmission resource needs to be allocated to a sending-side terminal device, so that the sending-side terminal device may send sidelink data to a receiving-side terminal device on the allocated sidelink transmission resource.

How to properly and effectively allocate sidelink transmission resources and improve sidelink communication efficiency is a problem that needs to be resolved currently.

SUMMARY

Embodiments of this application provide a wireless communication method, an apparatus, and a system, to properly and effectively allocate a sidelink transmission resource, and improve sidelink communication efficiency.

For example, in embodiments of this application, that a specific piece of information, for example, information A, may indicate another piece of information or another feature, for example, information B, may include any one of the following cases:

The information A includes the information B; and indicates an index or identification information of the information B.

For example, the information A indicates the information B from one or more pieces of candidate information B, and each piece of candidate information B in the one or more pieces of candidate information B corresponds to a unique index for identifying the candidate information B.

Alternatively, the information A is used to determine the information B. For example, the information B may be obtained by performing a mathematical operation or filtering on the information A.

It should be noted that the term "dedicated" or "special-purpose" in the following embodiments of this application may be understood as specified, network-configured, or protocol-predefined. The term "dedicated" may also be expressed as "specific", "specified", or the like. For example, a "dedicated scheduling request" in embodiments of this application may alternatively be expressed as a "specific scheduling request", a "specified scheduling request", or the like. For another example, a "dedicated resource" in embodiments of this application may alternatively be expressed as "a specific resource", "a specified resource", or the like. For details, refer to descriptions in the following embodiment. For still another example, a "dedicated buffer status report" in embodiments of this application may alternatively be expressed as "a specific buffer status report", "a specified buffer status report". For details, refer to descriptions in the following embodiments.

It should be noted that, in actual use, the "dedicated scheduling request" may alternatively be directly simplified as a "scheduling request", the "dedicated resource" may alternatively be directly simplified as a "resource", and the "dedicated buffer status report" may alternatively be directly simplified as a "buffer status report".

According to a first aspect, an embodiment of this application provides a wireless communication method. The method may be performed by a first terminal device or a chip. The method includes the following steps: obtaining mode information of a second terminal device, where the mode information indicates a resource scheduling manner of the second terminal device; and sending assistance information to the second terminal device based on the mode information, where the assistance information indicates one or more sets of sidelink transmission resources.

Based on the foregoing solution, a first terminal device provides, to the second terminal based on the mode information of the second terminal device, the assistance information indicating the one or more sets of sidelink transmission resources, so that the second terminal device or a network device may allocate or determine, based on the one or more sets of sidelink transmission resources indicated by referring to the assistance information, a sidelink transmission resource used by the second terminal device to transmit sidelink data. This can reduce resource conflicts or a waste of resources, and therefore can properly and effectively allocate the sidelink transmission resource. In this way, sidelink communication efficiency can be improved.

In a possible implementation, the obtaining of the mode information of a second terminal device includes: receiving of the mode information from the second terminal device.

Based on the implementation, the first terminal device may directly obtain the mode information of the second terminal device from the second terminal device. In this way, the mode information of the second terminal device can be accurately obtained.

In another possible implementation, the obtaining of the mode information of a second terminal device includes: receiving the mode information of the second terminal from the network device.

Based on the implementation, the first terminal device does not need to obtain the mode information of the second terminal device from the second terminal device, but instead obtains the mode information of the second terminal device from the network device. In this way, interaction between terminal devices can be reduced, energy consumption of the second terminal device can be reduced, and signaling overhead on a sidelink can be reduced.

In another possible implementation, the obtaining of the mode information of a second terminal device includes: obtaining the mode information of the second terminal device from the first terminal device, where the mode information in the first terminal device is preconfigured.

Based on the implementation, the mode information of the second terminal device is preconfigured in the first terminal device. In this way, the first terminal device does not need to obtain the mode information of the second terminal device from an external device. This reduces interaction between the first terminal device and the external device, and reduces energy consumption of the first terminal device.

In a possible implementation, a first request is sent to the second terminal device, where the first request requests to obtain the mode information.

Based on the implementation, when the first terminal device needs to obtain the mode information of the second terminal device, the first terminal device sends the first request to the second terminal device, so that the second terminal device sends the mode information of the second terminal device to the first terminal device based on the first request, to prevent the second terminal device from still sending the mode information of the second terminal device to the first terminal device when the first terminal device does not need the mode information of the second terminal device. This can reduce unnecessary overhead.

In a possible implementation, the sending of the assistance information to the second terminal device based on the mode information includes: when determining that the mode information indicates that the second terminal device is in a network device scheduling mode and an autonomous contention mode, sending the assistance information to the second terminal device; or when determining that the mode information indicates that the second terminal device is in an autonomous contention mode, sending the assistance information to the second terminal device.

Based on the foregoing solution, the assistance information is sent to the second terminal device only when it is determined that the second terminal device is in the network device scheduling mode and the autonomous contention mode, or is in the autonomous contention mode, so that the assistance information may be prevented from still being sent to the second terminal device when the second terminal device does not need the assistance information. This can reduce unnecessary information exchange and reduce energy consumption.

In a possible implementation, a first sidelink transmission resource for sending the assistance information is obtained; and the sending assistance information to the second terminal device based on the mode information includes: sending first information to the second terminal device on the first sidelink transmission resource based on the mode information, where the first information carries the assistance information.

In a possible implementation, that a first sidelink transmission resource for sending the assistance information is obtained includes: sending a dedicated scheduling request to a network device on a dedicated resource, where the dedicated scheduling request requests to allocate a sidelink transmission resource for sending the first information; and receiving the first sidelink transmission resource from the network device.

In a possible implementation, the dedicated resource is determined based on a format of the first information, where first information in different formats corresponds to different dedicated resources, and sizes of sidelink transmission resources that are indicated by assistance information carried in the first information in different formats are different.

Based on the foregoing solution, sidelink transmission resources of different sizes can be transmitted, and the sizes of the sidelink transmission resources are diversified.

In a possible implementation, the dedicated resource is determined based on a size of the first information, where first information of different sizes corresponds to different dedicated resources, and sizes of sidelink transmission resources that are indicated by assistance information carried in the first information of different sizes are different.

Based on the foregoing solution, sidelink transmission resources of different sizes can be transmitted, and the sizes of the sidelink transmission resources are diversified.

In a possible implementation, a size of the first sidelink transmission resource is determined; and if the size is less than a size of a sidelink transmission resource needed by the to-be-transmitted assistance information, truncated first information is generated, where the assistance information carried in the first information is less than the to-be-transmitted assistance information.

In a possible implementation, that a first sidelink transmission resource for sending the assistance information is obtained includes: sending a buffer status report to a network device, where the buffer status report requests to allocate a sidelink transmission resource for sending the first information, and the buffer status report indicates a size of the to-be-transmitted assistance information; and receiving the first sidelink transmission resource from the network device.

In another possible implementation, that a first sidelink transmission resource for sending the assistance information is obtained includes: sending a scheduling request to a network device on a non-dedicated resource (for example, a common resource), where the scheduling request requests to allocate a sidelink transmission resource for sending the first information; and receiving the first sidelink transmission resource from the network device.

In a possible implementation, the non-dedicated resource is determined based on a format of the first information, where first information in different formats corresponds to different non-dedicated resources, and sizes of sidelink transmission resources that are indicated by assistance information carried in the first information in different formats are different.

Based on the foregoing solution, sidelink transmission resources of different sizes can be transmitted, and the sizes of the sidelink transmission resources are diversified.

In a possible implementation, the non-dedicated resource is determined based on a size of the first information, where first information of different sizes corresponds to different non-dedicated resources, and sizes of sidelink transmission resources that are indicated by assistance information carried in the first information of different sizes are different.

Based on the foregoing solution, sidelink transmission resources of different sizes can be transmitted, and the sizes of the sidelink transmission resources are diversified.

In a possible implementation, the buffer status report carries a dedicated destination index, the dedicated destination index requests to allocate the sidelink transmission resource for sending the assistance information, and the dedicated destination index corresponds to the size of the to-be-transmitted assistance information.

In a possible implementation, the buffer status report carries a dedicated logical channel group identifier, the dedicated logical channel group identifier requests to allocate the sidelink transmission resource for sending the assistance information, and the dedicated logical channel group identifier corresponds to the size of the to-be-transmitted assistance information.

In a possible implementation, the buffer status report is a dedicated buffer status report.

In a possible implementation, a destination index carried in the buffer status report may alternatively be a non-dedicated destination index, for example, a common destination index, where the common destination index may request to allocate the sidelink transmission resource for sending the assistance information.

In a possible implementation, a logical channel group identifier carried in the buffer status report may alternatively be a non-dedicated logical channel group identifier, for example, a common logical channel group identifier, where the common logical channel group identifier may request to allocate the sidelink transmission resource for sending the assistance information.

In a possible implementation, the buffer status report is a non-dedicated buffer status report, for example, a common buffer status report.

In a possible implementation, the first information includes any one of the following: sidelink control information (SCI), PC5-radio resource control (RRC) signaling, and an SL medium access control control element (MAC CE).

In a possible implementation, the first information is two-stage SCI, the two-stage SCI includes first stage SCI and second stage SCI, and indication information in the first stage SCI indicates the size of the assistance information carried in the second stage SCI. For example, the indication information may indicate a format of the second stage SCI, or indicate a size of the second stage SCI, or indicate that the second stage SCI is common SCI or truncated SCI.

In a possible implementation, the first information is two-stage SCI, the two-stage SCI includes first stage SCI and second stage SCI, and the assistance information is carried in the first stage SCI.

In a possible implementation, before the sending assistance information to the second terminal device based on the mode information, the method further includes: determining that a preset policy condition is met, where the preset policy condition includes: a value of one or more parameters in a channel busy ratio (CBR), reference signal received power (RSRP), reference signal received quality (RSRQ), a received signal strength indicator (RSSI), a signal to noise and interference ratio (SINR), or a battery power of the first terminal device reaches a preset threshold or range.

According to a second aspect, an embodiment of this application provides a wireless communication method. The method may be performed by a second terminal device or a chip, and the method includes the following steps: receiving assistance information from a first terminal device, where the assistance information indicates one or more sets of sidelink transmission resources; and processing the assistance information based on mode information of the second terminal device, where the mode information indicates a resource scheduling manner of the second terminal device.

Based on the foregoing solution, a first terminal device provides, to the second terminal based on the mode information of the second terminal device, the assistance information indicating the one or more sets of sidelink transmission resources, so that the second terminal device or a network device may determine or allocate, based on the one or more sets of sidelink transmission resources indicated by referring to the assistance information, a sidelink transmission resource used by the second terminal device to transmit sidelink data. This can reduce resource conflicts or a waste of resources, and therefore can properly and effectively allocate the sidelink transmission resource. In this way, sidelink communication efficiency can be improved.

In a possible implementation, the processing of the assistance information based on mode information of the second terminal device includes: when the mode information indicates that the second terminal device is in an autonomous contention mode, determining, based on the assistance information, a first sidelink transmission resource for transmitting sidelink data of the second terminal device.

In a possible implementation, the processing of the assistance information based on mode information of the second terminal device includes: when the mode information indicates that the second terminal device is in an autonomous contention mode and a network device scheduling mode, or is in a network device scheduling mode, sending the assistance information to a network device, where the assistance information is utilized for generating a first sidelink transmission resource, and the first sidelink transmission resource is utilized for transmitting sidelink data of the second terminal device.

In a possible implementation, the one or more sets of sidelink transmission resources indicated by the assistance information include a preferentially used sidelink transmission resource, the first sidelink transmission resource corresponds to the preferentially used sidelink transmission resource, and the first sidelink transmission resource is preferentially used or is used only by the second terminal device to send the sidelink data to the first terminal device.

Based on this solution, the sidelink resource used by the second terminal device to send the sidelink data to the first terminal device is determined based on the preferentially used sidelink resource provided by the first terminal device. Therefore, the sidelink resource that can be used to send the sidelink data to the first terminal device can be quickly determined, and resource conflicts or a waste of resources can be reduced.

In a possible implementation, that the first sidelink transmission resource is preferentially used or is used only by the second terminal device to send the sidelink data to the first terminal device includes: a destination terminal device selected based on a sidelink logical channel priority mechanism that includes the first terminal device.

In a possible implementation, the one or more sets of sidelink transmission resources indicated by the assistance information include a preferentially unused sidelink transmission resource, the first sidelink transmission resource corresponds to the preferentially unused sidelink transmission resource, and the first sidelink transmission resource is not used by the second terminal device to send the sidelink data to the first terminal device.

Based on this solution, the sidelink resource for sending the sidelink data is determined based on the preferentially unused sidelink resource provided by the first terminal device. Therefore, it can be avoided that the preferentially unused sidelink resource is selected to send the sidelink data to the first terminal device, and resource conflicts or a waste of resources can be reduced.

In a possible implementation, that the first sidelink transmission resource is not used by the second terminal device to send the sidelink data to the first terminal device includes: a destination terminal device selected based on a sidelink logical channel priority mechanism that does not include the first terminal device.

In a possible implementation, the processing of the assistance information based on mode information of the second terminal device includes: when the mode information indicates that the second terminal device is in an autonomous contention mode and a network device scheduling mode, or is in a network device scheduling mode, discarding or ignoring the assistance information.

In a possible implementation, the mode information is sent to the first terminal device.

Based on the implementation, the first terminal device may directly obtain the mode information of the second terminal device from the second terminal device. In this way, the mode information of the second terminal device can be accurately obtained.

In a possible implementation, a first request from the first terminal device is received, where the first request requests to obtain the mode information.

Based on the implementation, when the first terminal device needs to obtain the mode information of the second terminal device, the first terminal device sends the first request to the second terminal device, so that the second terminal device sends the mode information of the second terminal device to the first terminal device based on the first request, to prevent the second terminal device from sending the mode information of the second terminal device to the first terminal device when the first terminal device does not need the mode information of the second terminal device. This can reduce unnecessary overhead.

In a possible implementation, a second request is sent to the first terminal device, where the second request requests to obtain the assistance information.

Based on the implementation, when the second terminal device needs to obtain the assistance information, the second terminal device sends the second request to the first terminal device, so that the first terminal device sends the assistance information to the second terminal device based on the second request, to prevent the first terminal device from still sending the assistance information to the second terminal device when the second terminal device does not need the assistance information. This can reduce unnecessary information overhead.

In a possible implementation, it is determined that a preset policy condition is met, where the preset policy condition includes: a value of one or more parameters in a CBR, RSRP, RSRQ, an RSSI, an SINR, or a battery power of the second terminal device reaches a preset threshold or range.

According to a third aspect, an embodiment of this application provides a wireless communication method. The method may be performed by a first terminal device or a chip, and the method includes the following steps: sending a dedicated scheduling request to a network device on a dedicated resource, where the dedicated scheduling request requests to allocate a sidelink transmission resource for sending sidelink control information: receiving the first sidelink transmission resource from the network device; and sending the sidelink control information to a second terminal device on the first sidelink transmission resource, where the sidelink control information carries assistance information, and the assistance information indicates one or more sets of sidelink transmission resources.

Based on the foregoing solution, allocation of the sidelink resource for transmitting the sidelink control information can be requested when sidelink data is not transmitted, where the sidelink control information carries one or more sets of sidelink transmission resources. In other words, the assistance information is sent to the second terminal device by using the sidelink control information, so that the second terminal device or a network device may allocate or determine, based on the one or more sets of sidelink transmission resources indicated by referring to the assistance information, a sidelink transmission resource used by the second terminal device to transmit sidelink data. This can reduce resource conflicts or a waste of resources, and therefore can properly and effectively allocate the sidelink transmission resource. In this way, sidelink communication efficiency can be improved.

In a possible implementation, the dedicated resource is determined based on a format of the sidelink control information, where sidelink control information in different formats corresponds to different dedicated resources, and sizes of sidelink transmission resources that are indicated by assistance information carried in the sidelink control information in different formats are different.

In a possible implementation, the dedicated resource is determined based on a size of the sidelink control information, where sidelink control information in different sizes corresponds to different dedicated resources, and sizes of sidelink transmission resources that are indicated by assistance information carried in the sidelink control information in different sizes are different.

Based on the foregoing solution, sidelink transmission resources of different sizes can be transmitted, and the sizes of the sidelink transmission resources are diversified.

In a possible implementation, a size of the first sidelink transmission resource is determined; and if the size is less than a size of a sidelink transmission resource needed by the to-be-transmitted assistance information, truncated sidelink control information is generated, where the assistance information carried in the sidelink control information is less than the to-be-transmitted assistance information.

In an implementation, the scheduling request may alternatively be sent to the network device on a non-dedicated resource (for example, a common resource), where the scheduling request requests to allocate a sidelink transmission resource for sending sidelink control information: the first sidelink transmission resource is received from the network device; and the sidelink control information is sent to the second terminal device on the first sidelink transmission resource, where the sidelink control information carries assistance information, and the assistance information indicates one or more sets of sidelink transmission resources.

In a possible implementation, the non-dedicated resource is determined based on a format of the sidelink control information, where sidelink control information in different formats corresponds to different non-dedicated resources, and sizes of sidelink transmission resources that are indicated by assistance information carried in the sidelink control information in different formats are different.

In a possible implementation, the non-dedicated resource is determined based on a size of the sidelink control information, where sidelink control information in different sizes corresponds to different non-dedicated resources, and sizes of sidelink transmission resources that are indicated by assistance information carried in the sidelink control information in different sizes are different.

Based on the foregoing solution, sidelink transmission resources of different sizes can be transmitted, and the sizes of the sidelink transmission resources are diversified.

According to a fourth aspect, an embodiment of this application provides a wireless communication method. The method may be performed by a first terminal device or a chip, and the method includes the following steps: sending a buffer status report to a network device, where the buffer status report requests to allocate a sidelink transmission resource for sending sidelink control information, and the buffer status report indicates a size of to-be-transmitted assistance information: receiving a first sidelink transmission resource from the network device; and sending the sidelink control information to a second terminal device on the first sidelink transmission resource, where the sidelink control information carries assistance information, and the assistance information indicates one or more sets of sidelink transmission resources.

Based on the foregoing solution, allocation of the sidelink resource for transmitting the sidelink control information can be requested by using the buffer status report, where the sidelink control information carries one or more sets of sidelink transmission resources. In other words, the assistance information is sent to the second terminal device by using the sidelink control information, so that the second terminal device or a network device may allocate or determine, based on the one or more sets of sidelink transmission resources indicated by referring to the assistance information, a sidelink transmission resource used by the second terminal device to transmit sidelink data. This can reduce resource conflicts or a waste of resources, and therefore can properly and effectively allocate the sidelink transmission resource. In this way, sidelink communication efficiency can be improved.

In a possible implementation, the buffer status report carries a dedicated destination index, the dedicated destination index requests to allocate the sidelink transmission resource for sending the assistance information, and the dedicated destination index corresponds to the size of the to-be-transmitted assistance information.

In a possible implementation, a destination index carried in the buffer status report may alternatively be a non-dedicated destination index, for example, a common destination index, where the common destination index may request to allocate the sidelink transmission resource for sending the assistance information.

In a possible implementation, a logical channel group identifier carried in the buffer status report may alternatively be a non-dedicated logical channel group identifier, for example, a common logical channel group identifier, where the common logical channel group identifier may request to allocate the sidelink transmission resource for sending the assistance information.

In a possible implementation, the buffer status report is a non-dedicated buffer status report, for example, a common buffer status report.

In a possible implementation, the buffer status report carries a dedicated logical channel group identifier, the dedicated logical channel group identifier requests to allocate the sidelink transmission resource for sending the assistance information, and the dedicated logical channel group identifier corresponds to the size of the to-be-transmitted assistance information.

In a possible implementation, the buffer status report is a dedicated buffer status report.

Based on the third aspect or the fourth aspect:

In a possible implementation, mode information from the second terminal device is received, where the mode information indicates that the second terminal device is in an autonomous contention mode, or is in an autonomous contention mode and a network device scheduling mode.

In a possible implementation, a first request is sent to the second terminal device, where the first request requests to obtain the mode information.

In a possible implementation, a second request from the second terminal device is received, where the second request requests to obtain the assistance information.

In a possible implementation, it is determined that a preset policy condition is met, where the preset policy condition includes: a value of one or more parameters in a CBR, RSRP, RSRQ, an RSSI, an SINR, or a battery power of the first terminal device reaches a preset threshold or range.

According to a fifth aspect, an embodiment of this application provides a wireless communication method. The method may be performed by a first terminal device or a chip, and the method includes the following steps: obtaining mode information of a second terminal device, where the mode information indicates a resource scheduling manner of the second terminal device; and determining, based on the mode information, whether to send assistance information to the second terminal device, where the assistance information indicates one or more sets of sidelink transmission resources.

Based on the foregoing solution, the first terminal device determines, based on the mode information of the second terminal device, whether to send the assistance information to the second terminal device. In this way, the assistance information may be sent only when the assistance information needs to be sent to the second terminal device, and unnecessary signaling overhead can be reduced. When the assistance information indicating the one or more sets of sidelink transmission resources is sent to the second terminal, the second terminal device or a network device may allocate or determine, based on the one or more sets of sidelink transmission resources indicated by referring to the assistance information, a sidelink transmission resource used by the second terminal device to transmit sidelink data. This can reduce resource conflicts or a waste of resources, and therefore can properly and effectively allocate the sidelink transmission resource. In this way, sidelink communication efficiency can be improved.

In a possible implementation, the determining, based on the mode information, whether to send assistance information to the second terminal device includes: when determining that the mode information indicates that the second terminal device is in a network device scheduling mode and an autonomous contention mode, determining to send the assistance information to the second terminal device: when determining that the mode information indicates that the second terminal device is in an autonomous contention mode, determining to send the assistance information to the second terminal device; or when determining that the mode information indicates that the second terminal device is in a network device scheduling mode, determining not to send the assistance information to the second terminal device.

Based on the foregoing solution, the assistance information is sent to the second terminal device only when it is determined that the second terminal device is in the network device scheduling mode and the autonomous contention mode, or is in the autonomous contention mode, so that the assistance information may be prevented from still sending to the second terminal device when the second terminal device does not need the assistance information. This can reduce unnecessary information exchange and reduce energy consumption.

In a possible implementation, the obtaining mode information of a second terminal device includes: receiving the mode information from the second terminal device.

Based on the implementation, the first terminal device may directly obtain the mode information of the second terminal device from the second terminal device. In this way, the mode information of the second terminal device can be accurately obtained.

In another possible implementation, the obtaining mode information of a second terminal device includes: receiving the mode information of the second terminal from the network device.

Based on the implementation, the first terminal device does not need to obtain the mode information of the second terminal device from the second terminal device, but obtains the mode information of the second terminal device from the network device. In this way, interaction between terminal devices can be reduced, energy consumption of the second terminal device can be reduced, and signaling overhead on a sidelink can be reduced.

In another possible implementation, the obtaining mode information of a second terminal device includes: obtaining the mode information of the second terminal device from the first terminal device, where the mode information in the first terminal device is preconfigured.

Based on the implementation, the mode information of the second terminal device is preconfigured in the first terminal device. In this way, the first terminal device does not need to obtain the mode information of the second terminal device from an external device. This reduces interaction between the first terminal device and the external device, and reduces energy consumption of the first terminal device.

In a possible implementation, a first request is sent to the second terminal device, where the first request requests to obtain the mode information.

Based on the implementation, when the first terminal device needs to obtain the mode information of the second terminal device, the first terminal device sends the first request to the second terminal device, so that the second terminal device sends the mode information of the second terminal device to the first terminal device based on the first request, to prevent the second terminal device from still sending the mode information of the second terminal device to the first terminal device when the first terminal device does not need the mode information of the second terminal device. This can reduce unnecessary overhead.

In a possible implementation, a first sidelink transmission resource for sending the assistance information is obtained; and when determining that the mode information indicates that the second terminal device is in a network device scheduling mode and an autonomous contention mode, the determining to send the assistance information to the second terminal device includes: when determining that the mode information indicates that the second terminal device is in a network device scheduling mode and an autonomous contention mode, determining to send the assistance information to the second terminal device on the first sidelink transmission resource.

In a possible implementation, a first sidelink transmission resource for sending the assistance information is obtained; and when determining that the mode information indicates that the second terminal device is in an autonomous contention mode, the determining to send the assistance information to the second terminal device includes: when determining that the mode information indicates that the second terminal device is in an autonomous contention mode, determining to send the assistance information to the second terminal device on the first sidelink transmission resource.

In a possible implementation, that a first sidelink transmission resource for sending the assistance information is obtained includes: sending a dedicated scheduling request to a network device on a dedicated resource, where the dedicated scheduling request requests to allocate a sidelink transmission resource for sending first information; and receiving the first sidelink transmission resource from the network device.

In a possible implementation, the dedicated resource is determined based on a format of the first information, where first information in different formats corresponds to different dedicated resources, and sizes of sidelink transmission resources that are indicated by assistance information carried in the first information in different formats are different.

Based on the foregoing solution, sidelink transmission resources of different sizes can be transmitted, and the sizes of the sidelink transmission resources are diversified.

In a possible implementation, the dedicated resource is determined based on a size of the first information, where first information in different sizes corresponds to different dedicated resources, and sizes of sidelink transmission resources that are indicated by assistance information carried in the first information in different sizes are different.

Based on the foregoing solution, sidelink transmission resources of different sizes can be transmitted, and the sizes of the sidelink transmission resources are diversified.

In a possible implementation, a size of the first sidelink transmission resource is determined; and if the size is less than a size of a sidelink transmission resource needed by the to-be-transmitted assistance information, truncated first information is generated, where the assistance information carried in the first information is less than the to-be-transmitted assistance information.

In a possible implementation, that a first sidelink transmission resource for sending the assistance information is obtained includes: sending a buffer status report to a network device, where the buffer status report requests to allocate a sidelink transmission resource for sending the first information, and the buffer status report indicates a size of the to-be-transmitted assistance information; and receiving the first sidelink transmission resource from the network device.

In another possible implementation, that a first sidelink transmission resource for sending the assistance information is obtained includes: sending a scheduling request to a network device on a non-dedicated resource (for example, may be a common resource), where the scheduling request requests to allocate a sidelink transmission resource for sending the first information; and receiving the first sidelink transmission resource from the network device.

In a possible implementation, the non-dedicated resource is determined based on a format of the first information, where first information in different formats corresponds to different non-dedicated resources, and sizes of sidelink transmission resources that are indicated by assistance information carried in the first information in different formats are different.

Based on the foregoing solution, sidelink transmission resources of different sizes can be transmitted, and the sizes of the sidelink transmission resources are diversified.

In a possible implementation, the non-dedicated resource is determined based on a size of the first information, where first information in different sizes corresponds to different non-dedicated resources, and sizes of sidelink transmission resources that are indicated by assistance information carried in the first information in different sizes are different.

Based on the foregoing solution, sidelink transmission resources of different sizes can be transmitted, and the sizes of the sidelink transmission resources are diversified.

In a possible implementation, the buffer status report carries a dedicated destination index, the dedicated destination index requests to allocate the sidelink transmission resource for sending the assistance information, and the dedicated destination index corresponds to the size of the to-be-transmitted assistance information.

In a possible implementation, the buffer status report carries a dedicated logical channel group identifier, the dedicated logical channel group identifier requests to allocate the sidelink transmission resource for sending the assistance information, and the dedicated logical channel group identifier corresponds to the size of the to-be-transmitted assistance information.

In a possible implementation, the buffer status report is a dedicated buffer status report.

In a possible implementation, a destination index carried in the buffer status report may alternatively be a non-dedicated destination index, for example, a common destination index, where the common destination index may request to allocate the sidelink transmission resource for sending the assistance information.

In a possible implementation, a logical channel group identifier carried in the buffer status report may alternatively be a non-dedicated logical channel group identifier, for example, a common logical channel group identifier, where the common logical channel group identifier may request to allocate the sidelink transmission resource for sending the assistance information.

In a possible implementation, the buffer status report is a non-dedicated buffer status report, for example, a common buffer status report.

In a possible implementation, the first information includes any one of the following: SCI, PC5-RRC signaling, and an SL MAC CE.

In a possible implementation, the first information is two-stage SCI, the two-stage SCI includes first stage SCI and second stage SCI, and indication information in the first stage SCI indicates the size of the assistance information carried in the second stage SCI. For example, the indication information may indicate a format of the second stage SCI, or indicate a size of the second stage SCI, or indicate that the second stage SCI is common SCI or truncated SCI.

In a possible implementation, the first information is two-stage SCI, the two-stage SCI includes first stage SCI and second stage SCI, and the assistance information is carried in the first stage SCI.

In a possible implementation, before the sending assistance information to the second terminal device, the method further includes: determining that a preset policy condition is met, where the preset policy condition includes: a value of one or more parameters in a CBR, RSRP. RSRQ, an RSSI, an SINR, or a battery power of the first terminal device reaches a preset threshold or range.

According to a sixth aspect, an embodiment of this application provides a communication apparatus. The apparatus may be a first terminal device, or may be a chip used in a first terminal device. The apparatus has a function of implementing the implementations in the first aspect, the third aspect, the fourth aspect, or the fifth aspect. The function may be implemented by hardware, or may be implemented by hardware executing corresponding software. The hardware or the software includes one or more modules corresponding to the function.

According to a seventh aspect, an embodiment of this application provides a communication apparatus. The apparatus may be a second terminal device, or may be a chip used in a second terminal device. The apparatus has a function of implementing the implementations in the second aspect. The function may be implemented by hardware, or may be implemented by hardware executing corresponding software. The hardware or the software includes one or more modules corresponding to the function.

According to an eighth aspect, an embodiment of this application provides a communication apparatus, including a processor and a memory. The memory is configured to store computer-executable instructions. When the apparatus is run (e.g., executed), the processor executes the computer-executable instructions stored in the memory, so that the apparatus performs the implementations in the first aspect to the fifth aspect.

According to a ninth aspect, an embodiment of this application provides a communication apparatus, including units or means configured to perform the steps of the implementations in the first aspect to the fifth aspect.

According to a tenth aspect, an embodiment of this application provides a communication apparatus, including a processor and an interface circuit. The processor is configured to: communicate with another apparatus through the interface circuit, and perform the implementations in the first aspect to the fifth aspect. There are one or more processors.

According to an eleventh aspect, this application provides a communication apparatus. The apparatus includes a processor, and is configured to: be connected to a memory, and invoke a program stored in the memory, to perform the implementations in the first aspect to the fifth aspect. The memory may be located inside or outside the apparatus. In addition, there are one or more processors.

According to a twelfth aspect, an embodiment of this application further provides a computer-readable storage medium. The computer-readable storage medium stores instructions, and when the instructions are run on a computer, the implementations in the first aspect to the fifth aspect are performed.

According to a thirteenth aspect, an embodiment of this application further provides a computer program product. The computer product includes a computer program, and when the computer program is run, the implementations in the first aspect to the fifth aspect are performed.

According to a fourteenth aspect, an embodiment of this application further provides a chip system. The chip system includes a processor, and is configured to perform the implementations in the first aspect to the fourth aspect.

According to a fifteenth aspect, an embodiment of this application further provides a communication system, including a first terminal device configured to perform any implementation in the first aspect and/or a second terminal device configured to perform any implementation in the second aspect.

According to a sixteenth aspect, an embodiment of this application further provides a communication system, including a first terminal device configured to perform any implementation in the third aspect and/or a second terminal device configured to perform any implementation in the second aspect.

According to a seventeenth aspect, an embodiment of this application further provides a communication system, including a first terminal device configured to perform any implementation in the fourth aspect and/or a second terminal device configured to perform any implementation in the second aspect.

According to an eighteenth aspect, an embodiment of this application further provides a communication system, including a first terminal device configured to perform any implementation in the fifth aspect and/or a second terminal device configured to perform any implementation in the second aspect.

DESCRIPTION OF EMBODIMENTS

In embodiments of this application, a terminal device is a device having a wireless communication transceiver function, or an apparatus or a chip system in a device having a wireless communication transceiver function. The terminal device in embodiments of this application supports sidelink communication, and may be deployed on land, including an indoor device, an outdoor device, a roadside device, a handheld device, or a vehicle-mounted device; or may be deployed on water (for example, on a ship); or may be deployed in the air (for example, on a plane, a balloon, or a satellite). The terminal device may be a mobile phone, a tablet computer (e.g., pad), a computer having a wireless transceiver function, a virtual reality (VR) terminal, an augmented reality (AR) terminal, a wireless terminal in industrial control, a wireless terminal in self-driving, a wireless terminal in telemedicine, a wireless terminal in a smart grid, a wireless terminal in transportation safety, a wireless terminal in a smart city, a wireless terminal in a smart home, user equipment (UE), a vehicle-mounted communication apparatus, a vehicle-mounted communication chip, a roadside unit, a communication apparatus in a roadside unit, or the like.

A network device is a device that provides a wireless communication service for the terminal device, and is usually located on a network side. For example, the network device includes but is not limited to a next-generation base station (gNodeB) in 5th generation (5G), an evolved NodeB (eNB), a baseband unit (BBU), a transmitting and receiving point (TRP), a transmission point (TP), a mobile switching center, an apparatus that provides a wireless communication service for the terminal device in a vehicle-to-everything (V2X) communication system, and the like.

Figure 1:
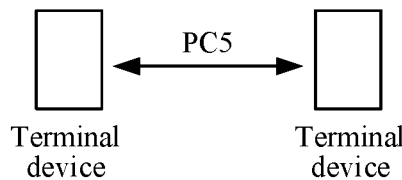
FIG. 1 is a schematic diagram of direct communication between terminal devices through a PC5 interface.
Figure 2:
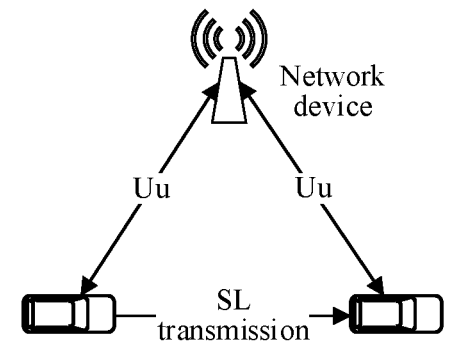
FIG. 2 shows a sidelink (SL) communication scenario in which an embodiment of this application is applied.

FIG. 2 shows a sidelink (SL) communication scenario in which an embodiment of this application shown in is applied. Unicast, multicast, or broadcast communication is supported on the SL. The first terminal device and the second terminal device may be located within coverage of a same network device, or may be located within coverage of different network devices. Alternatively, one terminal device is located within coverage of a network device, and the other terminal device is located outside of the coverage of the network device (out-of-coverage). Alternatively, the two terminal devices are both located outside coverage of a network device. Embodiments of this application may be used in a long term evolution (LTE) system, a new radio (NR) system, or a next generation wireless local area network (WLAN) system.

For SL transmission, the terminal device needs to obtain a resource in advance to send data. For example, there are at least the following manners of obtaining a resource on the SL:

(a) Mode 1: The mode 1 may also be referred to as a network device scheduling mode. Similar to a Uu interface, before sending SL data, the terminal device first reports an SL buffer status report (BSR) to a network device, to notify the network device of an amount of sidelink data to be sent. Then, the network device allocates, to the terminal device by using an SL grant, a sidelink transmission resource of a corresponding size, to transmit the sidelink data. Alternatively, for a periodic service, the terminal device reports an attribute (including start time, a periodicity, a packet size, and the like) of the periodic service. Then, the network device configures a periodic sidelink transmission resource for the terminal device. Subsequently, the terminal device does not need to frequently report a BSR to obtain the sidelink transmission resource.

(b) Mode 2: The mode 2 may also be referred to as an autonomous contention mode. For example, whether each time-frequency resource in a preconfigured SL resource pool is occupied is measured, to select an unoccupied resource for transmission. In this case, scheduling by the network device is not needed.

(c) Mode 1 and Mode 2: The mode 1 and mode 2 may also be referred to as mode 1+mode 2, or may be referred to as a network device scheduling mode and an autonomous contention mode. That the terminal device is in the network device scheduling mode and the autonomous contention mode may be understood as that the terminal device supports both the mode 1 and the mode 2. In other words, the terminal device may obtain a resource in the network device scheduling mode or the autonomous contention mode.

For example, the following describes the SL BSR.

Figure 3:
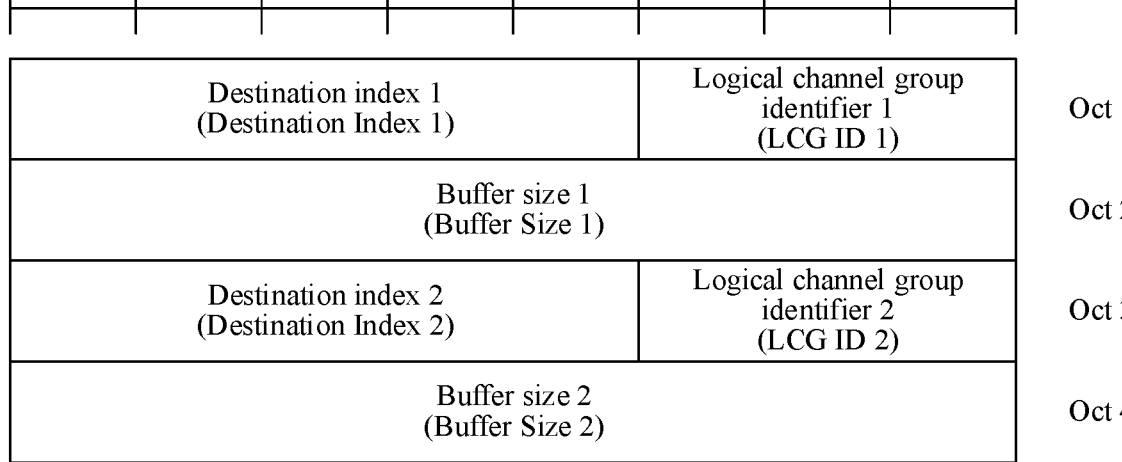
FIG. 3 is a schematic diagram of a format of an SL Buffer Status Report (BSR)

Based on the mode 1 described above, before sending SL data, the terminal device first reports the SL BSR to a network device, to notify the network device of an amount of sidelink data to be sent. Then, the network device allocates, to the terminal device by using an SL grant, a sidelink transmission resource of a corresponding size, to transmit the sidelink data. For example, a format of the SL BSR is shown in FIG. 3. The SL-BSR includes one or more pieces of destination group information, and each piece of destination group information includes a destination index, a logical channel group identifier (LCG ID), and a buffer size.

The destination index represents a corresponding destination. The destination may be a single terminal device, or a terminal device group, or may be a destination obtained by converting a broadcast service. In other words, the destination index indicates a data receiver, and the data receiver may be one or more terminal devices.

The logical channel group identifier indicates a group of logical channels (LCHs), and the logical channels indicated by the logical channel group identifier has data to be transmitted.

The buffer size indicates a size of a valid data amount obtained through calculation based on the SL data amount. The buffer size corresponds to a logical channel group under a destination.

It should be noted that, because data sent to a same destination may have priorities (where for example, logical channel groups of different priorities exist), same destination indexes may exist in one SL BSR. The same destination indexes correspond to different logical channel group identifiers, and the different logical channel group identifiers correspond to different logical channel groups.

A same SL BSR may also include a plurality of different destination indexes. In other words, a same terminal device may simultaneously request to send data to a plurality of terminal devices.

The following describes an SL logical channel prioritization (LCP) mechanism. It should be noted that SL LCP is performed only during each new transmission.

After obtaining the sidelink transmission resource from the network device, the terminal device needs to determine LCH data of a specific destination which the sidelink transmission resource is used to transmit. This includes the following two steps.

Step 1: Select a destination.

For example, the terminal device selects, from LCHs associated with unicast, multicast, and broadcast, a destination corresponding to an LCH that has a highest priority and that meets a first condition. For another example, the terminal device selects, from medium access control control elements (MAC CEs) associated with unicast, multicast, and broadcast, a destination corresponding to a MAC CE that has a highest priority and that meets a first condition.

The first condition may be one or more of the following: there is valid SL transmission data, SBj is greater than zero, and an SL-CG type1 is allowed to be used (where if an SL grant is used, correspondingly, a configured grant type1 is allowed to be used). The SL-CG is short for a sidelink configured grant. SBj indicates a quantity of currently available tokens in a token bucket maintained by a $j^{th}$ logical channel corresponding to a destination.

Step 2: Select an LCH.

For example, the terminal device selects an LCH that meets a second condition and that is associated with the destination selected in step 1.

The second condition may be one or more of the following: there is valid SL transmission data, an SL-CG type1 is allowed to be used (where if an SL grant is used, correspondingly, a configured grant type1 is allowed to be used), and whether an attribute of a hybrid automatic repeat request (HARQ) feedback corresponding to the LCH is enabled or disabled is the same as an attribute of a HARQ feedback corresponding to the LCH selected in step 1.

Based on the descriptions in the background, before communication between terminal devices is performed, a sidelink transmission resource needs to be allocated to a sending-side terminal device, so that the sending-side terminal device may send sidelink data to a receiving-side terminal device on the allocated sidelink transmission resource. To implement proper and effective allocation of sidelink transmission resources, in embodiments of this application, the first terminal device may send, to the second terminal device, assistance information indicating one or more sets of sidelink transmission resources, so that the second terminal device or the network device may allocate or determine, based on the one or more sets of sidelink transmission resources indicated by referring to the assistance information, a sidelink transmission resource used by the second terminal device to transmit sidelink data. This can reduce resource conflicts or a waste of resources, and therefore can properly and effectively allocate the sidelink transmission resource. In this way, sidelink communication efficiency can be improved.

For example, in the mode 2, the second terminal device may determine, based on the assistance information (where the assistance information indicates one or more sets of sidelink transmission resources) received from the first terminal device and/or the resource pool pre-allocated to the second terminal device, the sidelink transmission resource for sending sidelink data. In an implementation, the one or more sets of sidelink transmission resources indicated by the assistance information are a part of the resource pool pre-allocated to the second terminal device. In other words, the one or more sets of sidelink transmission resources indicated by the assistance information are included in the resource pool pre-allocated to the second terminal device. Certainly, in some embodiments, the assistance information indicates a relationship between the one or more sets of sidelink transmission resources and the resource pool pre-allocated to the second terminal device, or there may be no correspondence between the two.

For another example, in the mode 1, the second terminal device may send, to the network device, the assistance information received from the first terminal device, so that the network device allocates, to the second terminal device based on the assistance information, the sidelink transmission resource for sending sidelink data.

For another example, in the mode 1+mode 2, the second terminal device may determine, based on the assistance information received from the first terminal device and/or the resource pool pre-allocated to the second terminal device, the sidelink transmission resource for sending sidelink data; or may send, to the network device, the assistance information received from the first terminal device, so that the network device allocates, to the second terminal device based on the assistance information, the sidelink transmission resource for sending sidelink data.

Based on the foregoing resource allocation mechanism, currently, the following problems need to be resolved, for example:

Problem 1: When does the first terminal device send the assistance information to the second terminal device?

Problem 2: How does the first terminal device send the assistance information to the second terminal device?

Currently, when the first terminal device needs to send physical sidelink shared channel (PSSCH) data to the second terminal device, the first terminal device first requests, from the network device, a resource for sending sidelink control information (SCI) and a corresponding PSSCH, where the SCI indicates transmission of the PSSCH data. That is, in the background, the first terminal device may be triggered, only when there is to-be-transmitted PSSCH data, to request, from the network device, the resource for sending the SCI.

For example, the assistance information is carried in the SCI. If the first terminal device sends the assistance information to the second terminal device by including the assistance information in the SCI, the following problem exists: the first terminal device may not perform subsequent PSSCH data transmission when sending the assistance information by using the SCI. In other words, the first terminal device needs to send, to the second terminal device, the SCI carrying the assistance information, but the SCI does not indicate subsequent PSSCH data transmission. In this case, the first terminal device cannot trigger, based on the to-be-transmitted data, requesting, from the network device, the resource for sending the SCI. For example, in the mode 1, the first terminal device does not have to-be-transmitted data of a corresponding LCH, and cannot request, by using a scheduling request (SR) or a BSR, the sidelink transmission resource for sending the SCI.

Problem 3: How does the second terminal device perform data transmission by using the assistance information?

If how the second terminal device uses the assistance information is not defined, the second terminal device may not perform sidelink transmission based on an indication of the assistance information. Consequently, resource utilization is affected and sidelink transmission quality is reduced.

With reference to the accompanying drawings, the following describes, by using examples, solutions provided in this application to resolve the foregoing three problems.

In the following embodiments, the assistance information sent by the first terminal device to the second terminal device indicates one or more sets of sidelink transmission resources. In an optional implementation, the assistance information may include, for example, an index of a sidelink transmission resource, to indicate one or more sets of sidelink transmission resources. The second terminal device may use the one or more sets of sidelink transmission resources to send sidelink data to the first terminal device or another terminal device.

It should be noted that the following Embodiment 1 to Embodiment 3 are respectively used to resolve different problems. The three embodiments may be implemented independently of each other, or may be implemented in combination with each other.

Embodiment 1

This embodiment is used to resolve the foregoing problem 1, namely, when does the first terminal device send the assistance information to the second terminal device.

The following provides three different implementations.

Figure 4:
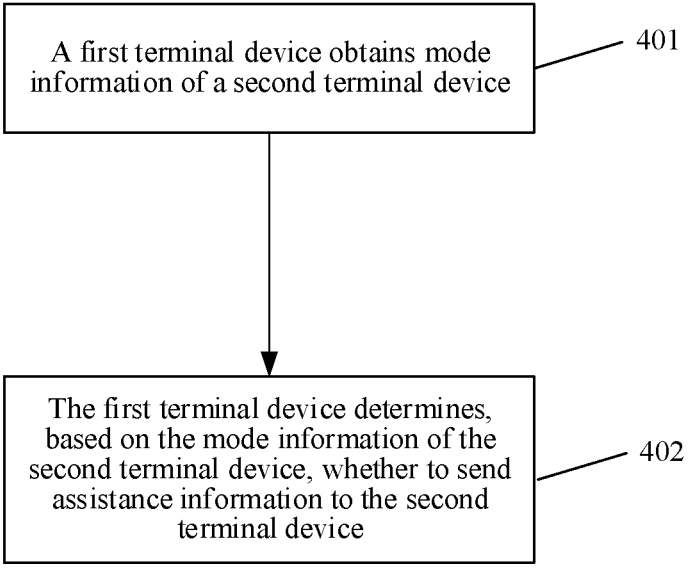
FIG. 4 is a schematic diagram of a wireless communication method according to an embodiment of this application.

FIG. 4 is a schematic diagram of a wireless communication method according to an embodiment of this application. The method is a first implementation to resolve the foregoing problem 1.

The method includes the following steps.

Step 401: A first terminal device obtains mode information of a second terminal device, where the mode information indicates a resource scheduling manner of the second terminal device.

Step 402: The first terminal device determines, based on the mode information of the second terminal device, whether to send assistance information to the second terminal device, where the assistance information indicates one or more sets of sidelink transmission resources.

The mode information indicates that the resource scheduling manner of the second terminal device is one or more of a mode 1, a mode 2, or a mode 1+mode 2. The mode 1 is a network device scheduling mode, the mode 2 is an autonomous contention mode, and the mode 1+mode 2 is the network device scheduling mode and the autonomous contention mode. It is easily understood that, that the mode information indicates the resource scheduling manner of the second terminal device may also be understood as that the mode information includes information indicating the resource scheduling manner of the second terminal device. For example, the mode information includes a field or a bit indicating the resource scheduling manner of the second terminal device.

Considering that in the mode 1, the second terminal device performs transmission based on an SL resource scheduled by the network device, the second terminal device may perform SL transmission by using the assistance information of the first terminal device only when the second terminal device is in the mode 2 or is in the mode 1+mode 2 (to be specific, in both the mode 1 and the mode 2). Therefore, when the first terminal device obtains that the mode information of the second terminal device is the mode 1, the first terminal device determines not to send the assistance information to the second terminal device. When the first terminal device obtains that the mode information of the second terminal device is the mode 1+mode 2, the first terminal device sends the assistance information to the second terminal device.

Methods in which the first terminal device obtains the mode information of the second terminal device include but are not limited to the following method a to method d:

Method a: The second terminal device actively sends the mode information of the second terminal device to the first terminal device.

Based on the implementation, the second terminal device does not need to send the mode information of the second terminal device to the first terminal device based on a request of the first terminal device, but actively sends the mode information of the second terminal device to the first terminal device. Therefore, information exchange can be reduced, and overhead are reduced.

Method b: The first terminal device sends a mode information request message (which may also be referred to as a first request) to the second terminal device, to request to obtain the mode information of the second terminal device, and the second terminal device sends the mode information of the second terminal device to the first terminal device based on the mode information request message.

Based on the implementation, when the first terminal device needs to obtain the mode information of the second terminal device, the first terminal device sends the first request to the second terminal device, so that the second terminal device sends the mode information of the second terminal device to the first terminal device based on the first request, to prevent the second terminal device from still sending the mode information of the second terminal device to the first terminal device when the first terminal device does not need the mode information of the second terminal device. This can reduce unnecessary overhead.

Optionally, when sending the mode information to the first terminal device, the second terminal device may carry the mode information in first information and send the first information to the first terminal device. The first information may be, for example, PC5-radio resource control (RRC) signaling, a PC5-S message, an SL MAC CE, or SCI.

Method c: The first terminal device receives the mode information of the second terminal from the network device.

That is, the network device sends the mode information of the second terminal device to the first terminal device.

Based on the implementation, the first terminal device does not need to obtain the mode information of the second terminal device from the second terminal device, but obtains the mode information of the second terminal device from the network device. In this way, interaction between terminal devices can be reduced, and energy consumption of the second terminal device can be reduced.

Method d: The mode information of the second terminal device is obtained from the first terminal device.

Alternatively, it is understood that the first terminal device locally obtains the mode information of the second terminal device. The mode information of the second terminal device obtained by the first terminal device may be preconfigured.

Based on the implementation, the mode information of the second terminal device is preconfigured in the first terminal device. In this way, the first terminal device does not need to obtain the mode information of the second terminal device from an external device. This reduces interaction between the first terminal device and the external device, and reduces energy consumption of the first terminal device.

Based on the foregoing method, because the second terminal device obtains the assistance information in time, SL transmission quality can be ensured.

Figure 5:
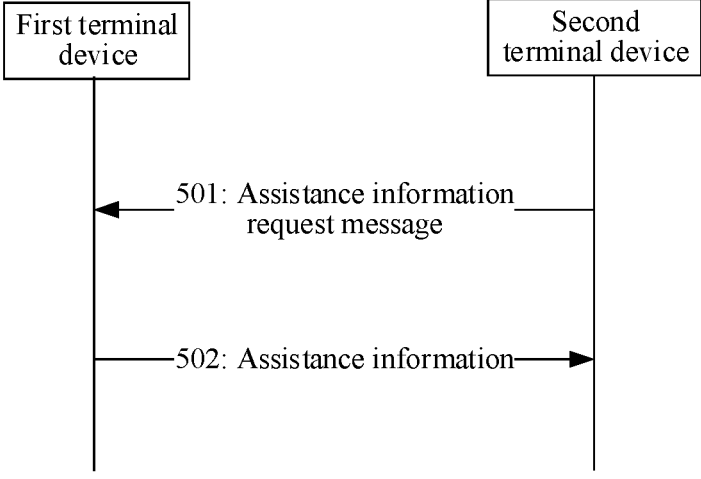
FIG. 5 is a schematic diagram of a wireless communication method according to an embodiment of this application.

FIG. 5 is a schematic diagram of a wireless communication method according to an embodiment of this application. The method is a second implementation to resolve the foregoing problem 1.

The method includes the following steps.

Step 501: A second terminal device sends an assistance information request message (which may also be referred to as a second request) to a first terminal device, where the assistance information request message requests to obtain assistance information.

Step 502: The first terminal device sends the assistance information to the second terminal device based on the assistance information request message.

Based on the method, the second terminal device actively requests to obtain the assistance information from the first terminal device.

Considering that the second terminal device performs transmission based on an SL resource scheduled by a network device when the second terminal device is in the mode 1, the second terminal device may perform SL transmission by using the assistance information of the first terminal device only when the second terminal device is in the mode 2 or is in the mode 1+mode 2 (to be specific, in both the mode 1 and the mode 2). Therefore, in an implementation, the second terminal device sends the assistance information request message to the first terminal device only when the mode information of the second terminal device is the mode 2 or the mode 1+mode 2. In another implementation, the second terminal device may send the assistance information request message to the first terminal device regardless of whether the mode information of the second terminal device is the mode 1, the mode 2, or the mode 1+mode 2.

In an implementation, the second terminal device sends the assistance information request message to the first terminal device when the second terminal device meets a preset policy condition. The preset policy condition may be that a value of one or more parameters in a channel busy rate (CBR), reference signal received power (RSRP), reference signal received quality (RSRQ), a received signal strength indication (RSSI), a signal to interference plus noise ratio (SINR), or a battery power reaches a preset threshold or range. For example, when the CBR of the second terminal device is within a preset CBR range or is greater than or equal to a preset CBR threshold, the second terminal device sends the assistance information request message to the first terminal device. The preset condition may further include that the second terminal device is in the mode 2 or is in the mode 1+mode 2.

Optionally, the preset policy condition may be configured for the second terminal device by using an RRC message or RRC dedicated information, or may be configured for the second terminal device by using a system information block (SIB), or may be preconfigured for the second terminal device, or may be predefined in a protocol. The pre-configuration may be, for example, configured by a core network or configured by a V2X application server, for example, configured during initial network access. Optionally, the preconfigured preset policy condition may be updated and modified, and preset policy conditions preconfigured for different terminal devices may be different. The preset policy conditions predefined in the protocol cannot be changed, and the preset policy conditions predefined in the protocol are the same in different terminal devices.

Based on the foregoing method, the first terminal device sends the assistance information to the second terminal device only when receiving the assistance information request message of the second terminal device, to avoid unnecessary information exchange and reduce a waste of resources. In addition, because the second terminal device obtains the assistance information in time, SL transmission quality can be ensured.

Figure 6:
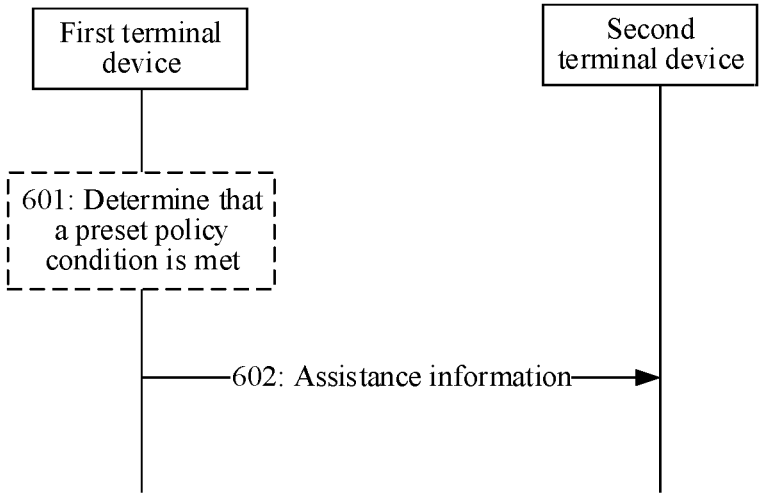
FIG. 6 is a schematic diagram of a wireless communication method according to an embodiment of this application.

FIG. 6 is a schematic diagram of a wireless communication method according to an embodiment of this application. The method is a third implementation to resolve the foregoing problem 1.

The method includes the following steps.

Step 601: A first terminal device determines that a preset policy condition is met.

This step is an optional step.

The preset policy condition may be that a value of one or more parameters in a CBR, RSRP, RSRQ, an RSSI, an SINR, a battery power, and the like reaches a preset threshold or range. For example, when the CBR of the first terminal device is within a preset CBR range or is greater than or equal to a preset CBR threshold, the first terminal device sends assistance information to a second terminal device.

Optionally, the preset policy condition may be configured for the first terminal device by using RRC dedicated information, or may be configured for the first terminal device by using a SIB, or may be preconfigured for the first terminal device, or may be predefined in a protocol.

Step 602: The first terminal device sends the assistance information to the second terminal device.

In the foregoing solutions, the first terminal device sends the assistance information to the second terminal device when determining that the preset policy condition is met. In another implementation, the first terminal device may alternatively periodically send the assistance information to the second terminal device.

Based on the foregoing methods, the first terminal device may actively send the assistance information to the second terminal device based on determining of the first terminal device, so that information exchange can be reduced, and a waste of resources is reduced. In addition, because the second terminal device obtains the assistance information in time, SL transmission quality can be ensured.

Embodiment 2

This embodiment is used to resolve the foregoing problem 2, namely, how does the first terminal device send the assistance information to the second terminal device.

In this embodiment, it is considered that the first terminal device is in the mode 1, and the first terminal device sends the assistance information to the second terminal device based on SCI. It can be learned from the foregoing analysis that, because the SCI is not associated with subsequent PSSCH data transmission, an SR or a BSR cannot be triggered to request a sidelink transmission resource from a network device according to the current technology. Therefore, there is no sidelink transmission resource to send the assistance information. To resolve this problem, in some embodiments, the first terminal device may obtain a first sidelink transmission resource for sending the assistance information. Then, the first terminal device sends first information to the second terminal device on the first sidelink transmission resource, the first information carries the assistance information, and the assistance information indicates one or more sets of sidelink transmission resources. Optionally, the first information may be, for example, PC5-RRC signaling, a PC5-S message, an SL MAC CE, or SCI.

For ease of description, an example in which the first information is SCI is used below for description.

The following provides two different implementations in which the first terminal device obtains the first sidelink transmission resource for sending the assistance information.

Figure 7:
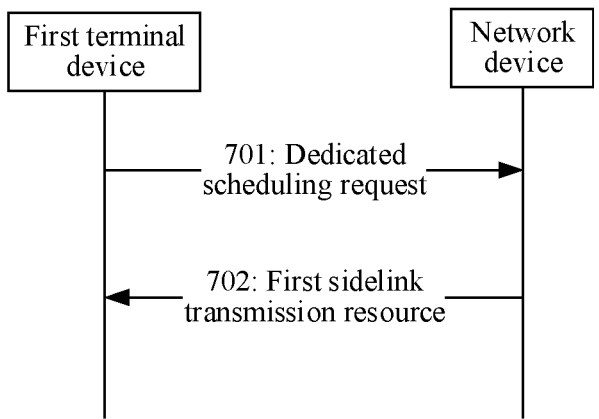
FIG. 7 is a schematic diagram of a wireless communication method according to an embodiment of this application.

FIG. 7 is a schematic diagram of a wireless communication method according to an embodiment of this application. The method is a first implementation in which the first terminal device obtains the first sidelink transmission resource for sending the assistance information.

The method includes the following steps.

Step 701: The first terminal device sends a dedicated scheduling request (dedicated SR) to a network device on a dedicated resource, where the dedicated scheduling request requests to allocate a sidelink transmission resource for sending SCI.

Step 702: The first terminal device receives the first sidelink transmission resource from the network device.

Based on the foregoing solution, the SCI for transmitting the assistance information is pre-associated with a dedicated configuration, and the first terminal device requests, based on the dedicated SR configuration, the network device to allocate a sidelink transmission resource for sending the assistance information.

For example, an SR ID corresponding to the SCI is predefined in a protocol or is configured by the network device. When the first terminal device sends the SR to the network device on a resource corresponding to the SR ID, the network device may learn, based on the resource, that the first terminal device requests the sidelink transmission resource for transmitting the assistance information, so as to configure the corresponding sidelink transmission resource for the first terminal device.

Optionally, considering that the assistance information may indicate a plurality of sets of sidelink resources, and quantities of sidelink transmission resources indicated by the assistance information transmitted by using the SCI each time may be different, sizes of sidelink transmission resources that are requested from the network device and that are used for sending the assistance information may be different. Therefore, it needs to be clarified how to enable the network device to accurately configure a sidelink transmission resource of a corresponding size. The following provides three different implementations.

In a first implementation, a plurality of SCI formats may be predefined. One SCI format may be corresponding to one or more sets of sidelink transmission resources, and sidelink transmission resources indicated by assistance information carried in SCI in different formats have different sizes. For example, an SCI format 1 corresponds to transmission of one set of sidelink transmission resources, an SCI format 2 corresponds to transmission of two sets of sidelink transmission resources, and so on. In addition. SCI in different formats corresponds to different dedicated resources. For example, a dedicated SR configuration corresponding to the SCI format 1 is an SR ID 1 and a resource 1, and a dedicated SR configuration corresponding to the SCI format 2 is an SR ID 2 and a resource 2. For example, the first terminal device may determine a corresponding SCI format based on a size of the to-be-transmitted assistance information, determine a corresponding dedicated resource based on the SCI format, and then send an SR to the network device on the dedicated resource (for example, the resource 1). In this case, the network device may determine to allocate, to the first terminal device, a sidelink transmission resource corresponding to the SCI format 1, to transmit the SCI.

Optionally, the first terminal device may indicate, by using indication information in first stage SCI, a format corresponding to second stage SCI, so that the second terminal device can learn, based on the indication information, a size of the sidelink transmission resource indicated by the assistance information sent by the first terminal device. For example, the SCI is two-stage SCI, the two-stage SCI includes first stage SCI and second stage SCI, and indication information in the first stage SCI indicates the size of the assistance information carried in the second stage SCI. In other words, the assistance information may be jointly indicated by using the two-stage SCI, where the first stage SCI indicates the second stage SCI, and the second stage SCI carries the assistance information. It is easily understood that, the indication information in the first stage SCI is merely an example. All information that can indicate association information of the assistance information carried in the second stage SCI may be carried in the indication information in the first stage SCI, and may carry a part or all of the association information. For example, the association information may be information associated with the size of the assistance information, information associated with a resource indicated in the assistance information, or the like.

Optionally: the SCI is two-stage SCI, the two-stage SCI includes first stage SCI and second stage SCI, and the assistance information may alternatively be carried in the first stage SCI. This is not limited in embodiments of this application. Similarly, the first stage SCI may alternatively carry association information of the assistance information.

In a second implementation, one SCI format may be predefined. The SCI format may be corresponding to a plurality of SCI sizes, and sidelink transmission resources indicated by assistance information carried in SCI in different sizes have different sizes. For example, a first SCI size corresponds to transmission of one set of sidelink transmission resources, a second SCI size corresponds to transmission of two sets of sidelink transmission resources, and so on. In addition. SCI in different sizes corresponds to different dedicated resources. For example, a dedicated SR configuration corresponding to the first SCI size is an SR ID 1 and a resource 1, and a dedicated SR configuration corresponding to the second SCI size is an SR ID 2 and a resource 2. For example, the first terminal device may determine a corresponding SCI size based on a size of the to-be-transmitted assistance information, determine a corresponding dedicated resource based on the SCI size, and then send an SR to the network device on the dedicated resource (for example, the resource 1). In this case, the network device may determine to allocate, to the first terminal device, a sidelink transmission resource corresponding to the first SCI size, to transmit the SCI.

In a third implementation, truncated SCI is introduced. It may be understood that when a size of a sidelink transmission resource requested by using a dedicated SR is less than a size of a sidelink transmission resource needed by the to-be-transmitted assistance information, as much assistance information as possible may be sent by using the truncated SCI. A format of normal SCI is different from a format of the truncated SCI. For example, the normal SCI may transmit 100 megabytes of assistance information, but the size of the sidelink transmission resource requested by the first terminal device by using the dedicated SR cannot transmit 100 megabytes of assistance information. In this case, the first terminal device determines to transmit a part of assistance information, for example, transmit 50 megabytes of assistance information, by using the truncated SCI. Therefore, the first terminal device generates the truncated SCI, and the truncated SCI carries 50 megabytes of assistance information. Optionally, indication information in first stage SCI may indicate whether second stage SCI corresponds to the normal SCI or the truncated SCI. In this way, the second terminal device may learn, based on the indication information, whether the sidelink transmission resources indicated by the assistance information sent by the first terminal device are all sidelink transmission resources or a part of sidelink transmission resources.

It should be noted that, in the foregoing provided implementation, the dedicated resource and the dedicated scheduling request are used to request the network device to allocate the sidelink transmission resource for sending SCI. In another implementation, the scheduling request may alternatively be sent to the network device on a non-dedicated resource (for example, a common resource), where the scheduling request requests to allocate the sidelink transmission resource for sending the SCI, and then the first sidelink transmission resource is received from the network device. Optionally, the first terminal device may determine the non-dedicated resource based on the SCI format, where SCI in different formats corresponds to different non-dedicated resources, and sizes of sidelink transmission resources that are indicated by assistance information carried in the SCI in different formats are different. Optionally, the first terminal device may determine the non-dedicated resource based on a size of the SCI, where SCI in different sizes corresponds to different non-dedicated resources, and sizes of sidelink transmission resources that are indicated by assistance information carried in the SCI in different sizes are different.

Therefore, the first terminal device may send the scheduling request to the network device on a resource (for example, the dedicated resource or the non-dedicated resource), where the scheduling request requests to allocate the sidelink transmission resource for sending the SCI. Then, the first terminal device receives the first sidelink transmission resource from the network device.

Figure 8:
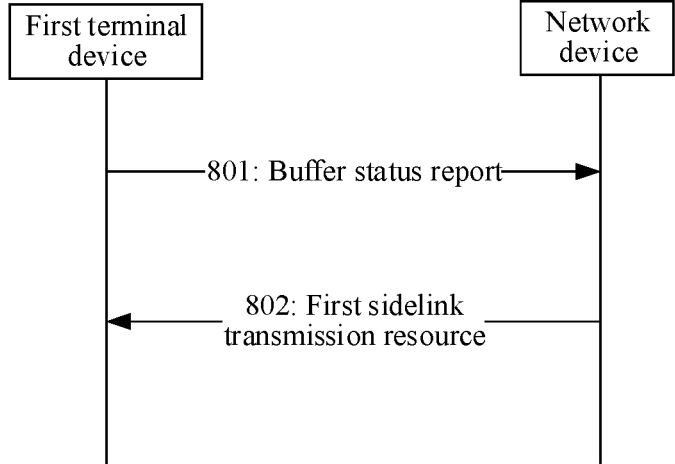
FIG. 8 is a schematic diagram of a wireless communication method according to an embodiment of this application.

FIG. 8 is a schematic diagram of a wireless communication method according to an embodiment of this application. The method is a second implementation in which the first terminal device obtains the first sidelink transmission resource for sending the assistance information.

The method includes the following steps.

Step 801: The first terminal device sends a buffer status report (BSR) to a network device, where the buffer status report requests to allocate a sidelink transmission resource for sending sidelink control information, and the buffer status report indicates a size of the to-be-transmitted assistance information.

Step 802: The first terminal device receives a first sidelink transmission resource from the network device.

Based on the foregoing solution, the first terminal device obtains, based on reporting of the BSR, the sidelink transmission resource for sending the assistance information. The BSR may also be referred to as an SL BSR.

For a format of the SL BSR, refer to FIG. 3. When the first terminal device sends the SL BSR to the network device, to request, from the network device, the sidelink transmission resource for sending the assistance information, a buffer size in the SL BSR may be a size of the to-be-transmitted assistance information. For example, the buffer size is a size of to-be-transmitted SCI that carries the assistance information.

For example, the following provides three implementations.

In a first implementation, an existing SL BSR format, namely, the format shown in FIG. 3, may still be used. In addition, when a destination index in the SL BSR is a dedicated destination index, the dedicated destination index requests to allocate the sidelink transmission resource for sending the assistance information. Therefore, the SL BSR requests the sidelink transmission resource corresponding to the assistance information. It may be understood that the network device configures the corresponding sidelink transmission resource based on a buffer size corresponding to the dedicated destination index. That is, the dedicated destination index corresponds to the size of the to-be-transmitted assistance information.

In a second implementation, an existing SL BSR format, namely, the format shown in FIG. 3, may still be used. In addition, when a logical channel group identifier in the SL BSR is a dedicated logical channel group identifier, the dedicated logical channel group identifier requests to allocate the sidelink transmission resource for sending the assistance information. Therefore, the SL BSR requests the sidelink transmission resource corresponding to the assistance information. It may be understood that the network device configures the corresponding sidelink transmission resource based on a buffer size corresponding to the dedicated logical channel group identifier. That is, the dedicated logical channel group identifier corresponds to the size of the to-be-transmitted assistance information.

In a third implementation, an existing SL BSR format may not be used, but a dedicated buffer status report is used. The dedicated buffer status report corresponds to a dedicated BSR format, and the dedicated buffer status report requests the sidelink transmission resource corresponding to the assistance information. It may be understood that the network device configures the corresponding sidelink transmission resource based on a buffer size corresponding to the dedicated BSR format. The dedicated buffer status report may be understood as a buffer status report used only to request to configure the sidelink transmission resource.

It may be understood that the dedicated BSR format and the existing SL BSR format may be different MAC CEs. For example, another MAC CE may be designed to support the dedicated BSR format. The additionally designed MAC CE is different from a MAC CE corresponding to the existing SL BSR format. "Dedicated" may be represented as follows: Each MAC CE has its own LCID to identify the MAC CE. The dedicated BSR format herein is equivalent to a MAC CE corresponding to a dedicated LCID.

Optionally, a MAC layer of the first terminal device determines the assistance information and the corresponding sidelink transmission resource, and indicates the assistance information and the corresponding sidelink transmission resource to a physical layer (PHY layer) for sending.

It may be understood that, this embodiment describes a case in which the SCI carries the assistance information. When the SL MAC CE carries the assistance information, the solutions of some embodiments are also applicable.

Based on the foregoing solution, the first terminal device can obtain the sidelink transmission resource for sending the assistance information, to ensure that the assistance information can be normally sent. Therefore, after receiving the assistance information, the second terminal device can better perform SL communication based on the assistance information, to improve communication quality.

It should be noted that, in the foregoing provided implementation, the dedicated destination index, the dedicated logical channel group identifier, and the dedicated buffer status report are used to request the network device to allocate the sidelink transmission resource for sending SCI. In another implementation, a non-dedicated buffer status report (for example, a common buffer status report) may request the network device to allocate the sidelink transmission resource for sending SCI, where the non-dedicated buffer status report may carry a non-dedicated destination index (for example, a common destination index), and the non-dedicated destination index may request to allocate the sidelink transmission resource for sending assistance information; alternatively, the non-dedicated buffer status report may carry a non-dedicated logical channel group identifier (for example, a common logical channel group identifier), and the non-dedicated logical channel group identifier may request to allocate the sidelink transmission resource for sending the assistance information.

Therefore, the first terminal device may send a buffer status report (for example, the dedicated buffer status report or the non-dedicated buffer status report) to the network device, and the buffer status report requests to allocate the sidelink transmission resource for sending SCI. Then, the first terminal device receives the first sidelink transmission resource from the network device.

Embodiment 3

This embodiment is used to resolve the foregoing problem 3, namely; how does the second terminal device perform data transmission by using one or more sets of resource sidelink transmission resources indicated by the assistance information.

To resolve this problem, in some embodiments, when the second terminal device receives assistance information from a first terminal device, where the assistance information indicates one or more sets of sidelink transmission resources, the second terminal device processes the assistance information based on mode information of the second terminal device, where the mode information of the second terminal device indicates a resource scheduling manner of the second terminal device. The mode information of the second terminal device includes a mode 1, a mode 2, or a mode 1+mode 2.

Based on different mode information of the second terminal device, the following provides three different implementations in which the second terminal device processes the assistance information based on the mode information of the second terminal device.

Method 1: When the mode information of the second terminal device indicates that the second terminal device is in the mode 1 or in the mode 1+mode 2, and the second terminal device receives the assistance information, the second terminal device may report the assistance information to the network device, so that the network device may allocate the first sidelink transmission resource to the second terminal device based on the assistance information.

Optionally, the second terminal device may report the assistance information to the network device based on a sidelink user information (e.g., Sidelink UE information, SUI) message, a user assistance information (e.g., UE Assistance information, UAI) message, or the like.

Optionally, when reporting the assistance information, the second terminal device may further report a destination L2 ID associated with the assistance information. It may be understood that the destination L2 ID herein is a source L2 ID of the first terminal device that sends the assistance information.

Method 2: When the mode information of the second terminal device indicates that the second terminal device is in the mode 1 or in the mode 1+mode 2, the second terminal device may discard or ignore the assistance information.

For example, the second terminal device may determine, at a MAC layer or an RRC layer, whether the assistance information needs to be discarded or ignored.

Optionally, the second terminal device discards or ignores only a preferentially unused sidelink transmission resource in the one or more sets of sidelink transmission resources indicated by the assistance information.

Optionally, after discarding or ignoring the assistance information, the second terminal device feeds back indication information to the first terminal device, where the indication information indicates that the second terminal device no longer needs the assistance information. This prevents the first terminal device from subsequently sending unnecessary assistance information to the second terminal device. For example, the indication information may be carried on PC5-RRC signaling, an SL MAC CE, or a physical layer sidelink feedback channel (PSFCH).

Method 3: When the mode information of the second terminal device indicates that the second terminal device is in the mode 2, and the second terminal device receives the assistance information, the second terminal device may allocate or determine the first sidelink transmission resource to the second terminal device based on the assistance information.

Based on the foregoing solutions, after receiving the assistance information, the second terminal device may obtain a more proper sidelink transmission resource based on the assistance information, or select a proper destination based on the sidelink transmission resource for communication, to improve resource utilization and ensure SL communication quality:

In a possible implementation, regardless of whether the second terminal device is in the mode 1, the mode 2, or the mode 1+mode 2, after the second terminal device receives the assistance information from the first terminal device, if the one or more sets of sidelink transmission resources indicated by the assistance information include a preferentially used sidelink transmission resource, and the first sidelink transmission resource that is utilized for transmitting sidelink data of the second terminal device and that is determined by the second terminal device or the network device includes a part or all of the preferentially used sidelink transmission resource, in other words, the first sidelink transmission resource corresponds to the preferentially used sidelink transmission resource, the first sidelink transmission resource is preferentially used or is used only by the second terminal device to send the sidelink data to the first terminal device. For example, if the assistance information sent by the first terminal device to the second terminal device indicates the preferentially used sidelink transmission resource, the preferentially used sidelink transmission resource includes a resource 1, a resource 2, and a resource 3, and the first sidelink transmission resource that is utilized for transmitting the sidelink data of the second terminal device and that is determined by the second terminal device or the network device includes the resource 1, a resource 4, and a resource 5, in a manner, the resource 1, the resource 4, and the resource 5 are preferentially used or is used only by the second terminal device to send the sidelink data to the first terminal device. Alternatively, in another manner, the resource 1 is preferentially used or is used only by the second terminal device to send the sidelink data to the first terminal device, and the resource 4 and the resource 5 may be preferentially used or used only by the second terminal device to send the sidelink data to the first terminal device, or may not be preferentially used or used only by the second terminal device to send the sidelink data to the first terminal device. Based on this implementation, when the first sidelink transmission resource corresponds to the preferentially used sidelink transmission resource, when a destination is selected based on an SL LCP, a destination corresponding to the first terminal device is preferentially selected, or only the destination corresponding to the first terminal device is selected.

It should be noted that the "being preferentially selected" herein may be understood as follows: when there is a destination corresponding to the first terminal device, the destination corresponding to the first terminal device is preferentially selected; or when there is no destination corresponding to the first terminal device, a destination corresponding to another terminal device is selected according to an existing technical solution. That "only the destination corresponding to the first terminal device is selected" herein may be understood as follows: when there is a destination corresponding to the first terminal device, the destination corresponding to the first terminal device is selected; or when there is no destination corresponding to the first terminal device, a destination corresponding to another terminal device is not selected, in other words, a sidelink transmission resource is not allocated for another terminal device.

It should be noted that the preferentially used sidelink transmission resource may also be understood as a preferred resource set (e.g., support resource set which is preferred for UE's transmission) used when the second terminal device performs transmission.

In a possible implementation, regardless of whether the second terminal device is in the mode 1, the mode 2, or the mode 1+mode 2, after the second terminal device receives the assistance information from the first terminal device, if the one or more sets of sidelink transmission resources indicated by the assistance information include a preferentially unused sidelink transmission resource, and the first sidelink transmission resource that is utilized for transmitting sidelink data of the second terminal device and that is determined by the second terminal device or the network device includes a part or all of the preferentially unused sidelink transmission resource, in other words, the first sidelink transmission resource corresponds to the preferentially unused sidelink transmission resource, the first sidelink transmission resource is not used by the second terminal device to send the sidelink data to the first terminal device. For example, if the assistance information sent by the first terminal device to the second terminal device indicates the preferentially unused sidelink transmission resource, the preferentially unused sidelink transmission resource includes a resource 4 and a resource 5, and the first sidelink transmission resource that is utilized for transmitting the sidelink data of the second terminal device and that is determined by the second terminal device or the network device includes a resource 1, the resource 4, and the resource 5, in a manner, the resource 1, the resource 4, and the resource 5 are not used by the second terminal device to send the sidelink data to the first terminal device. Alternatively, in another manner, the resource 4 and the resource 5 are not used by the second terminal device to send the sidelink data to the first terminal device, and the resource 1 may or may not be used by the second terminal device to send the sidelink data to the first terminal device. Based on this implementation, when the first sidelink transmission resource corresponds to the preferentially unused sidelink transmission resource, when a destination is selected based on an SL LCP, a destination corresponding to the first terminal device is not selected.

It should be noted that, the preferentially unused sidelink transmission resource may also be understood as a resource set preferred not to be used when the second terminal device performs transmission (support resource set which is preferred not to be used by UE's transmission).

Figure 9:
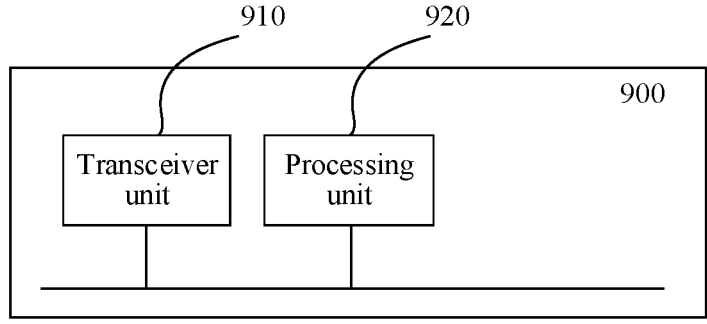
FIG. 9 is a schematic diagram of a communication apparatus according to an embodiment of this application.

FIG. 9 is a schematic diagram of a communication apparatus according to an embodiment of this application. The apparatus is configured to implement steps performed by the first terminal device or the second terminal device in the foregoing embodiments. As shown in FIG. 9, an apparatus 900 includes a transceiver unit 910 (e.g., transceiver circuit) and a processing unit 920 (e.g., processing circuit).

In a first embodiment, when the communication apparatus is a first terminal device or a chip used in a first terminal device: the processing unit 920 is configured to obtain mode information of a second terminal device, where the mode information indicates a resource scheduling manner of the second terminal device; and the processing unit 920 is configured to send assistance information to the second terminal device based on the mode information through the transceiver unit 910, where the assistance information indicates one or more sets of sidelink transmission resources.

In a possible implementation, that the processing unit 920 is configured to obtain mode information of a second terminal device includes: being configured to receive the mode information from the second terminal device through the transceiver unit 910.

In a possible implementation, the transceiver unit 910 is further configured to send a first request to the second terminal device, where the first request requests to obtain the mode information.

In a possible implementation, that the processing unit 920 is configured to send assistance information to the second terminal device based on the mode information through the transceiver unit 910 includes: being configured to: when determining that the mode information indicates that the second terminal device is in a network device scheduling mode and an autonomous contention mode, send the assistance information to the second terminal device through the transceiver unit 910; or being configured to: when determining that the mode information indicates that the second terminal device is in an autonomous contention mode, send the assistance information to the second terminal device through the transceiver unit 910.

In a possible implementation, the processing unit 920 is further configured to obtain a first sidelink transmission resource for sending the assistance information; and that the processing unit 920 is configured to send assistance information to the second terminal device based on the mode information through the transceiver unit 910 includes: being configured to send first information to the second terminal device on the first sidelink transmission resource based on the mode information through the transceiver unit 910, where the first information carries the assistance information.

In a possible implementation, that the processing unit 920 is configured to obtain a first sidelink transmission resource for sending the assistance information includes: being configured to: send a dedicated scheduling request to a network device on a dedicated resource through the transceiver unit 910, where the dedicated scheduling request requests to allocate a sidelink transmission resource for sending the first information; and receive the first sidelink transmission resource from the network device through the transceiver unit 910.

In a possible implementation, the processing unit 920 is further configured to determine the dedicated resource based on a format of the first information, where first information in different formats corresponds to different dedicated resources, and sizes of sidelink transmission resources that are indicated by assistance information carried in the first information in different formats are different.

In a possible implementation, the processing unit 920 is further configured to determine the dedicated resource based on a format of the first information, where first information in different sizes corresponds to different dedicated resources, and sizes of sidelink transmission resources that are indicated by assistance information carried in the first information in different sizes are different.

In a possible implementation, the processing unit 920 is further configured to: determine a size of the first sidelink transmission resource; and if the size is less than a size of a sidelink transmission resource needed by the to-be-transmitted assistance information, generate truncated first information, where the assistance information carried in the first information is less than the to-be-transmitted assistance information.

In a possible implementation, that the processing unit 920 is configured to obtain a first sidelink transmission resource for sending the assistance information includes: being configured to: send a buffer status report to a network device through the transceiver unit 910, where the buffer status report requests to allocate a sidelink transmission resource for sending the first information, and the buffer status report indicates a size of the to-be-transmitted assistance information; and receive the first sidelink transmission resource from the network device through the transceiver unit 910.

In a possible implementation, the buffer status report carries a dedicated destination index, the dedicated destination index requests to allocate the sidelink transmission resource for sending the assistance information, and the dedicated destination index corresponds to the size of the to-be-transmitted assistance information.

In a possible implementation, the buffer status report carries a dedicated logical channel group identifier, the dedicated logical channel group identifier requests to allocate the sidelink transmission resource for sending the assistance information, and the dedicated logical channel group identifier corresponds to the size of the to-be-transmitted assistance information.

In a possible implementation, the buffer status report is a dedicated buffer status report.

In a possible implementation, the first information includes any one of the following: SCI, PC5-RRC signaling, and a SL MAC CE.

In a possible implementation, the first information is two-stage SCI, the two-stage SCI includes first stage SCI and second stage SCI, and indication information in the first stage SCI indicates the size of the assistance information carried in the second stage SCI.

In a possible implementation, the first information is two-stage SCI, the two-stage SCI includes first stage SCI and second stage SCI, and the assistance information is carried in the first stage SCI.

In a possible implementation, the processing unit 920 is further configured to: before sending the assistance information to the second terminal device based on the mode information through the transceiver unit 910, determine that a preset policy condition is met, where the preset policy condition includes: a value of one or more parameters in a CBR, RSRP, RSRQ, a RSSI, a SINR, or a battery power of the first terminal device reaches a preset threshold or range.

In a second embodiment, when the communication apparatus is a second terminal device or a chip used in a second terminal device: the transceiver unit 910 is configured to receive assistance information from a first terminal device, where the assistance information indicates one or more sets of sidelink transmission resources; and the processing unit 920 is configured to process the assistance information based on mode information of the second terminal device, where the mode information indicates a resource scheduling manner of the second terminal device.

In a possible implementation, that the processing unit 920 is configured to process the assistance information based on mode information of a second terminal device includes: being configured to: when the mode information indicates that the second terminal device is in an autonomous contention mode, determine, based on the assistance information, a first sidelink transmission resource for transmitting sidelink data of the second terminal device.

In a possible implementation, that the processing unit 920 is configured to process the assistance information based on mode information of the second terminal device includes: being configured to: when the mode information indicates that the second terminal device is in an autonomous contention mode and a network device scheduling mode, or is in a network device scheduling mode, send the assistance information to a network device through the transceiver unit 910, where the assistance information is utilized for generating a first sidelink transmission resource, and the first sidelink transmission resource is utilized for transmitting sidelink data of the second terminal device.

In a possible implementation, the one or more sets of sidelink transmission resources indicated by the assistance information include a preferentially used sidelink transmission resource, the first sidelink transmission resource corresponds to the preferentially used sidelink transmission resource, and the first sidelink transmission resource is preferentially used or is used only by the second terminal device to send the sidelink data to the first terminal device.

In a possible implementation, that the first sidelink transmission resource is preferentially used or is used only by the second terminal device to send the sidelink data to the first terminal device includes: a destination terminal device selected based on a sidelink logical channel priority that mechanism includes the first terminal device.

In a possible implementation, the one or more sets of sidelink transmission resources indicated by the assistance information include a preferentially unused sidelink transmission resource, the first sidelink transmission resource corresponds to the preferentially unused sidelink transmission resource, and the first sidelink transmission resource is not used by the second terminal device to send the sidelink data to the first terminal device.

In a possible implementation, that the first sidelink transmission resource is not used by the second terminal device to send the sidelink data to the first terminal device includes: a destination terminal device selected based on a sidelink logical channel priority that mechanism does not include the first terminal device.

In a possible implementation, that the processing unit 920 is configured to process the assistance information based on mode information of the second terminal device includes: being configured to: when the mode information indicates that the second terminal device is in an autonomous contention mode and a network device scheduling mode, or is in a network device scheduling mode, discard or ignore the assistance information.

In a possible implementation, the transceiver unit 910 is further configured to send the mode information to the first terminal device.

In a possible implementation, the transceiver unit 910 is further configured to receive a first request from the first terminal device, where the first request requests to obtain the mode information.

In a possible implementation, the transceiver unit 910 is further configured to send a second request to the first terminal device, where the second request requests to obtain the assistance information.

In a possible implementation, the processing unit 920 is further configured to determine that a preset policy condition is met, where the preset policy condition includes: a value of one or more parameters in a CBR, RSRP, RSRQ, a RSSI, a SINR, or a battery power of the second terminal device reaches a preset threshold or range.

In a third embodiment, when the communication apparatus is a first terminal device or a chip used in a first terminal device: the transceiver unit 910 is configured to: send a dedicated scheduling request to a network device on a dedicated resource, where the dedicated scheduling request requests to allocate a sidelink transmission resource for sending sidelink control information: receive the first sidelink transmission resource from the network device; and send the sidelink control information to a second terminal device on the first sidelink transmission resource, where the sidelink control information carries assistance information, and the assistance information indicates one or more sets of sidelink transmission resources.

In a possible implementation, the processing unit 920 is configured to determine the dedicated resource based on a format of the sidelink control information, where sidelink control information in different formats corresponds to different dedicated resources, and sizes of sidelink transmission resources that are indicated by assistance information carried in the sidelink control information in different formats are different.

In a possible implementation, the processing unit 920 is configured to determine the dedicated resource based on a size of the sidelink control information, where sidelink control information in different sizes corresponds to different dedicated resources, and sizes of sidelink transmission resources that are indicated by assistance information carried in the sidelink control information in different sizes are different.

In a possible implementation, the processing unit 920 is configured to: determine a size of the first sidelink transmission resource; and if the size is less than a size of a sidelink transmission resource needed by the to-be-transmitted assistance information, generate truncated sidelink control information, where the assistance information carried in the sidelink control information is less than the to-be-transmitted assistance information.

In a possible implementation, the transceiver unit 910 is further configured to receive mode information from the second terminal device, where the mode information indicates that the second terminal device is in an autonomous contention mode, or is in an autonomous contention mode and a network device scheduling mode.

In a possible implementation, the transceiver unit 910 is further configured to send a first request to the second terminal device, where the first request requests to obtain the mode information.

In a possible implementation, the transceiver unit 910 is further configured to receive a second request from the second terminal device, where the second request requests to obtain the assistance information.

In a possible implementation, the processing unit 920 is configured to determine that a preset policy condition is met, where the preset policy condition includes: a value of one or more parameters in a CBR, RSRP. RSRQ, an RSSI, an SINR, or a battery power of the first terminal device reaches a preset threshold or range.

In a fourth embodiment, when the communication apparatus is a first terminal device or a chip used in a first terminal device: the transceiver unit 910 is configured to: send a buffer status report to a network device, where the buffer status report requests to allocate a sidelink transmission resource for sending sidelink control information, and the buffer status report indicates a size of the to-be-transmitted assistance information: receive a first sidelink transmission resource from the network device; and send the sidelink control information to a second terminal device on the first sidelink transmission resource, where the sidelink control information carries assistance information, and the assistance information indicates one or more sets of sidelink transmission resources.

In a possible implementation, the buffer status report carries a dedicated destination index, the dedicated destination index requests to allocate the sidelink transmission resource for sending the assistance information, and the dedicated destination index corresponds to the size of the to-be-transmitted assistance information.

In a possible implementation, the buffer status report carries a dedicated logical channel group identifier, the dedicated logical channel group identifier requests to allocate the sidelink transmission resource for sending the assistance information, and the dedicated logical channel group identifier corresponds to the size of the to-be-transmitted assistance information.

In a possible implementation, the buffer status report is a dedicated buffer status report.

In a possible implementation, the transceiver unit 910 is further configured to receive mode information from the second terminal device, where the mode information indicates that the second terminal device is in an autonomous contention mode, or is in an autonomous contention mode and a network device scheduling mode.

In a possible implementation, the transceiver unit 910 is further configured to send a first request to the second terminal device, where the first request requests to obtain the mode information.

In a possible implementation, the transceiver unit 910 is further configured to receive a second request from the second terminal device, where the second request requests to obtain the assistance information.

In a possible implementation, the processing unit 920 is configured to determine that a preset policy condition is met, where the preset policy condition includes: a value of one or more parameters in a CBR, RSRP, RSRQ, an RSSI, an SINR, or a battery power of the first terminal device reaches a preset threshold or range.

Optionally, the communication apparatus 900 may further include a storage unit (e.g., storage circuit). The storage unit is configured to store data or instructions (which may also be referred to as code or a program). The foregoing units may interact with or be coupled to the storage unit, to implement a corresponding method or function. For example, the processing unit 920 may read the data or instructions in the storage unit, so that the communication apparatus implements the methods in the foregoing embodiments.

It should be understood that division of the foregoing apparatus into the units is merely logical function division. In an actual implementation, all or some of the units may be integrated into a physical entity, or may be physically separate. In addition, all the units in the apparatus may be implemented in a form of software invoked by a processing element, or may be implemented in a form of hardware; or some units may be implemented in a form of software invoked by a processing element, and some units may be implemented in a form of hardware. For example, each unit may be an independently disposed processing element, or may be integrated into a chip of the apparatus for implementation. Alternatively, each unit may be stored in a memory in a form of a program to be invoked by a processing element of the apparatus to perform a function of the unit. In addition, all or some of the units may be integrated together, or may be implemented independently. The processing element herein may also be referred to as a processor, and may be an integrated circuit having a signal processing capability: In an implementation process, steps in the foregoing method or the foregoing units may be implemented by using a hardware integrated logic circuit in the processor element, or may be implemented in a form of software invoked by the processing element.

For example, a unit in any one of the foregoing apparatuses may be one or more integrated circuits configured to implement the foregoing method, for example, one or more application-specific integrated circuits (ASICs), one or more microprocessors (DSPs), one or more field programmable gate arrays (FPGAs), or a combination of at least two of the integrated circuits. For another example, when the unit in the apparatus may be implemented in a form of scheduling a program by a processing element, the processing element may be a general-purpose processor, for example, a central processing unit (CPU) or another processor that can invoke the program. For still another example, the units may be integrated and implemented in a form of a system-on-a-chip (SOC).

The foregoing transceiver unit 910 is an interface circuit of the apparatus, and is configured to receive a signal from another apparatus or send a signal to another apparatus. For example, when the apparatus is implemented in a form of a chip, the transceiver unit 910 is an interface circuit configured by the chip to receive a signal from another chip or apparatus, or an interface circuit configured to send a signal to another chip or apparatus.

Figure 10:
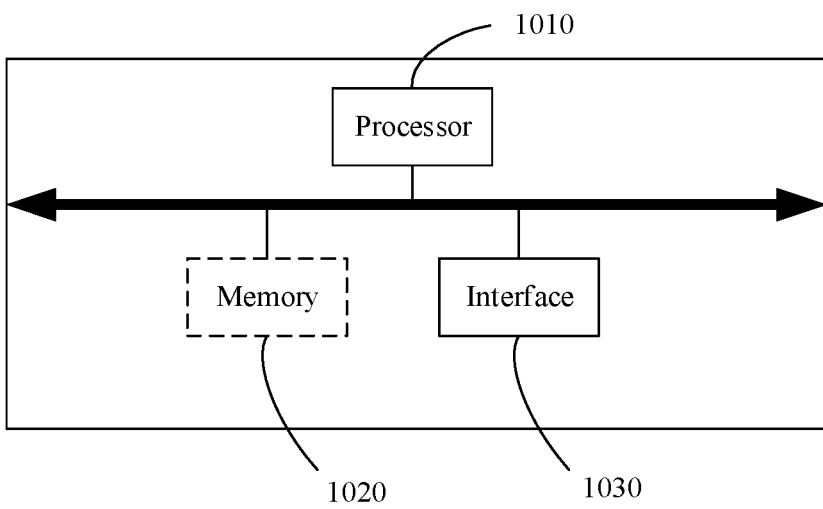
FIG. 10 is a schematic diagram of a communication apparatus according to an embodiment of this application.

FIG. 10 is a schematic diagram of a communication apparatus according to an embodiment of this application. The communication apparatus is configured to implement the operations of the first terminal device or the second terminal device in the foregoing embodiments. As shown in FIG. 10, the communication apparatus includes a processor 1010 and an interface 1030. Optionally, the communication apparatus further includes a memory 1020. The interface 1030 is configured to communicate with another device.

In the foregoing embodiments, the method performed by the first terminal device or the second terminal device may be implemented by the processor 1010 by invoking a program stored in a memory (which may be the memory 1020 in the first terminal device or the second terminal device, or may be an external memory). That is, the first terminal device or the second terminal device may include the processor 1010, and the processor 1010 invokes a program in the memory, to perform the method performed by the first terminal device or the second terminal device in the foregoing method embodiments. The processor herein may be an integrated circuit having a signal processing capability, for example, a CPU. The first terminal device or the second terminal device may be implemented by one or more integrated circuits, for example, one or more ASICs, one or more microprocessors DSPs, or one or more FPGAs. or a combination of at least two of these types of integrated circuits, configured to implement the foregoing method. Alternatively, the foregoing implementations may be combined.

Functions/implementation processes of the transceiver unit 910 and the processing unit 920 in FIG. 9 may be implemented by the processor 1010 in the communication apparatus 1000 shown in FIG. 10 by invoking computer-executable instructions stored in the memory 1020. Alternatively, a function/an implementation process of the processing unit 920 in FIG. 9 may be implemented by the processor 1010 in the communication apparatus 1000 shown in FIG. 10 by invoking computer-executable instructions stored in the memory 1020, and a function/an implementation process of the transceiver unit 910 in FIG. 9 may be implemented through the interface 1030 in the communication apparatus 1000 shown in FIG. 10.

A person of ordinary skill in the art may understand that various reference numerals such as "first" and "second" in this application are merely used for differentiation for ease of description, and are not used to limit a scope of embodiments of this application, or represent a sequence. The term "and/or" describes an association relationship for describing associated objects and represents that three relationships may exist. For example. A and/or B may represent the following three cases: Only A exists, both A and B exist, and only B exists. The character "/" usually indicates an "or" relationship between the associated objects. "At least one" means one or more. "At least two" means two or more. "At least one". "any one", or a similar expression thereof indicates any combination of these items, including any combination of singular items (pieces) or plural items (pieces). For example, at least one item (piece or type) of a, b, or c may indicate: a, b, c, a and b, a and c, b and c, or a, b, and c, where a, b, and c may be singular or plural. "A plurality of" means two or more, and another quantifier is similar thereto.

It should be understood that sequence numbers of the foregoing processes do not mean execution sequences in various embodiments of this application. The execution sequences of the processes should be determined according to functions and internal logic of the processes, and should not be construed as any limitation on the implementation processes of embodiments of the present disclosure.

This application further provides a computer-readable medium. The computer-readable medium stores a computer program. When the computer program is executed by a computer, a function of any one of the foregoing method embodiments are implemented.

This application further provides a computer program product. When the computer program product is executed by a computer, a function of any one of the foregoing method embodiments is implemented.

It can be clearly understood by a person skilled in the art that, for a purpose of convenient and brief descriptions, for a detailed working process of the foregoing system, apparatus, and unit, refer to a corresponding process in the foregoing method embodiment. Details are not described herein again.

All or some of the foregoing embodiments may be implemented by using software, hardware, firmware, or any combination thereof. When software is used to implement the embodiments, all or some of the embodiments may be implemented in a form of a computer program product. The computer program product includes one or more computer instructions. When the computer program instructions are loaded and executed on the computer, the procedure or functions according to the embodiments of this application are completely or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by the computer, or a data storage device, for example, a server or a data center, integrating one or more usable media. The usable medium may be a magnetic medium (for example, a floppy disk, a hard disk, or a magnetic tape), an optical medium (for example, a Digital Versatile Disc (DVD)), a semiconductor medium (for example, a solid-state drive (SSD)), or the like.

The various illustrative logical units and circuits described in embodiments of this application may implement or operate the described functions by using a general-purpose processor, a digital signal processor, an ASIC, a FPGA or another programmable logical apparatus, a discrete gate or transistor logic, a discrete hardware component, or a design of any combination thereof. The general-purpose processor may be a microprocessor. Optionally, the general-purpose processor may also be any conventional processor, controller, microcontroller, or state machine. The processor may also be implemented by a combination of computing apparatuses, such as a digital signal processor and a microprocessor, a plurality of microprocessors, one or more microprocessors with a digital signal processor core, or any other similar configuration.

Steps of the methods or algorithms described in embodiments of this application may be directly embedded into hardware, a software unit executed by a processor, or a combination thereof. The software unit may be stored in a random access memory (RAM), a flash memory, a read-only memory (ROM), an erasable programable ROM (EPROM) memory, an electrically erasable programmable ROM (EE-PROM) memory, a register, a hard disk, a removable magnetic disk, a compact disc (CD)-ROM, or a storage medium of any other form in the art. For example, the storage medium may connect to a processor so that the processor may read information from the storage medium and write information to the storage medium. Optionally, the storage medium may alternatively be integrated into a processor. The processor and the storage medium may be disposed in an ASIC.

These computer program instructions may alternatively be loaded onto a computer or another programmable data processing device, so that a series of operation steps are performed on the computer or the another programmable device to generate computer-implemented processing, and instructions executed on the computer or the another programmable device provide steps for implementing a function specified in one or more procedures in the flowchart and/or one or more blocks in the block diagram.

In one or more example designs, the functions described in this application may be implemented by hardware, software, firmware, or any combination thereof. If the functions are implemented by using software, the functions may be stored in a computer-readable medium or may be transmitted to the computer-readable medium in a form of one or more instructions or code. The computer-readable medium includes a computer storage medium and a communication medium that enables a computer program to move from one place to another place. The storage medium may be an available medium that may be accessed by any general or special computer. For example, such a computer-readable medium may include but is not limited to a RAM, a ROM, an EEPROM, a CD-ROM or another optical disc storage, a disk storage or another magnetic storage apparatus, or any other medium that may be used to carry or store program code, where the program code is in a form of instructions or a data structure or in a form that can be read by a general or special computer or a general or special processor. In addition, any connection may be appropriately defined as a computer-readable medium. For example, if software is transmitted from a website, a server, or another remote resource by using a coaxial cable, an optical fiber computer, a twisted pair, a DSL, or in a wireless manner, such as infrared, radio, or microwave, the software is included in the defined computer-readable medium. The disc and the disc include a compressed disk, a laser disk, an optical disc, a DVD, a floppy disk, and a Blu-ray disc. The disk usually copies data by a magnetic means, and the disc usually copies data optically by a laser means. The foregoing combination may also be included in the computer-readable medium.

A person skilled in the art should be aware that in the foregoing one or more examples, functions described in this application may be implemented by hardware, software, firmware, or any combination thereof. When the functions are implemented by software, the functions may be stored in a computer-readable medium or transmitted as one or more instructions or code in a computer-readable medium. The computer-readable medium includes a computer storage medium and a communication medium, and the communication medium includes any medium that enables a computer program to be transmitted from one place to another. The storage medium may be any available medium accessible to a general-purpose or special-purpose computer.

The objectives, technical solutions, and beneficial effects of this application are further described in detail in the foregoing embodiments. It should be understood that the foregoing descriptions are merely embodiments of this application, but are not intended to limit the protection scope of this application. Any modification, equivalent replacement, or improvement made based on the technical solutions of this application shall fall within the protection scope of this application. According to the foregoing descriptions of this specification in this application, a person skilled in the art may use or implement the content of this application. Any modification based on the disclosed content shall be considered obvious in the art. The basic principles described in this application may be applied to other variations without departing from the essence and scope of this application. Therefore, the content disclosed in this application is not limited to the described embodiments and designs, but may also be extended to a maximum scope that is consistent with the principles and new features disclosed in this application.

Although this application is described with reference to specific features and the embodiments thereof, it is clear that various modifications and combinations may be made to this application without departing from scope of this application. Correspondingly, the specification and accompanying drawings are merely example descriptions of this application defined by the appended claims, and are considered as any of or all modifications, variations, combinations or equivalents that cover the scope of this application. It is clear that a person skilled in the art can make various modifications and variations to this application without departing from the scope of this application. This application is intended to cover these modifications and variations of this application provided that they fall within the scope of the claims of this application and their equivalent technologies.

What is claimed is:

1. A wireless communication method for a first terminal device, and comprising:

obtaining mode information of a second terminal device, wherein the mode information indicates a resource scheduling manner of the second terminal device; and sending assistance information to the second terminal device based on the mode information, wherein the assistance information indicates one or more sets of sidelink transmission resources; wherein the one or more sets of sidelink transmission resources indicated by the assistance information comprise a preferentially used sidelink transmission resource, the first sidelink transmission resource corresponds to the preferentially used sidelink transmission resource, and the first sidelink transmission resource is preferentially used or is used only by the second terminal device to send the sidelink data to the first terminal device; or the one or more sets of sidelink transmission resources indicated by the assistance information comprise a preferentially unused sidelink transmission resource, the first sidelink transmission resource corresponds to the preferentially unused sidelink transmission resource, and the first sidelink transmission resource is not used by the second terminal device to send the sidelink data to the first terminal device.

2. The method according to claim 1, wherein the obtaining of the mode information of the second terminal device comprises:

receiving the mode information from the second terminal device.

3. The method according to claim 2, further comprising:

sending a first request to the second terminal device, wherein the first request requests to obtain the mode information.

4. The method according to claim 1, wherein the sending of the assistance information to the second terminal device based on the mode information comprises:

when determining that the mode information indicates that the second terminal device is in a network device scheduling mode and an autonomous contention mode, sending the assistance information to the second terminal device; or when determining that the mode information indicates that the second terminal device is in the autonomous contention mode, sending the assistance information to the second terminal device.

5. A wireless communication method for a second terminal device, and comprising:

receiving assistance information from a first terminal device, wherein the assistance information indicates one or more sets of sidelink transmission resources; and processing the assistance information based on mode information of the second terminal device, wherein the mode information indicates a resource scheduling manner of the second terminal device; wherein the one or more sets of sidelink transmission resources indicated by the assistance information comprise a preferentially used sidelink transmission resource, the first sidelink transmission resource corresponds to the preferentially used sidelink transmission resource, and the first sidelink transmission resource is preferentially used or is used only by the second terminal device to send the sidelink data to the first terminal device; or the one or more sets of sidelink transmission resources indicated by the assistance information comprise a preferentially unused sidelink transmission resource, the first sidelink transmission resource corresponds to the preferentially unused sidelink transmission resource, and the first sidelink transmission resource is not used by the second terminal device to send the sidelink data to the first terminal device.

6. The method according to claim 5, wherein the processing of the assistance information based on the mode information of the second terminal device comprises:

when the mode information indicates that the second terminal device is in an autonomous contention mode, determining, based on the assistance information, a first sidelink transmission resource for transmitting sidelink data of the second terminal device.

7. The method according to claim 5, wherein the processing of the assistance information based on the mode information of the second terminal device comprises:

when the mode information indicates that the second terminal device is in an autonomous contention mode and a network device scheduling mode, or is in the network device scheduling mode, sending the assistance information to a network device, wherein the assistance information is utilized for generating a first sidelink transmission resource, and the first sidelink transmission resource is utilized for transmitting sidelink data of the second terminal device.

8. The method according to claim 5, wherein that the first sidelink transmission resource is preferentially used or is used only by the second terminal device to send the sidelink data to the first terminal device comprises:

when a destination terminal device selected based on a sidelink logical channel priority mechanism comprises the first terminal device, the first sidelink transmission resource is preferentially used or is used only by the second terminal device to send the sidelink data to the first terminal device.

9. The method according to claim 5, wherein that the first sidelink transmission resource is not used by the second terminal device to send the sidelink data to the first terminal device comprises:

when a destination terminal device selected based on a sidelink logical channel priority mechanism does not comprise the first terminal device, the first sidelink transmission resource is preferentially used or is used only by the second terminal device to send the sidelink data to the first terminal device.

10. The method according to claim 5, wherein the processing of the assistance information based on the mode information of the second terminal device comprises:

when the mode information indicates that the second terminal device is in an autonomous contention mode and a network device scheduling mode, or is in the network device scheduling mode, discarding or ignoring the assistance information.

11. An apparatus, comprising:

at least one processor; and a memory storing programming, the programming including instructions that, when executed by the at least one processor, cause the apparatus to perform:

receiving assistance information from a first terminal device, wherein the assistance information indicates one or more sets of sidelink transmission resources; and processing the assistance information based on mode information of the apparatus, wherein the mode information indicates a resource scheduling manner of the apparatus; wherein the one or more sets of sidelink transmission resources indicated by the assistance information comprise a preferentially used sidelink transmission resource, the first sidelink transmission resource corresponds to the preferentially used sidelink transmission resource, and the first sidelink transmission resource is preferentially used or is used only by the second terminal device to send the sidelink data to the first terminal device; or the one or more sets of sidelink transmission resources indicated by the assistance information comprise a preferentially unused sidelink transmission resource, the first sidelink transmission resource corresponds to the preferentially unused sidelink transmission resource, and the first sidelink transmission resource is not used by the second terminal device to send the sidelink data to the first terminal device.

12. The apparatus according to claim 11, wherein the processing of the assistance information based on the mode information of the apparatus comprises:

when the mode information indicates that the apparatus is in an autonomous contention mode, determining, based on the assistance information, a first sidelink transmission resource for transmitting sidelink data of the apparatus.

13. The apparatus according to claim 11, wherein the processing of the assistance information based on the mode information of the apparatus comprises:

when the mode information indicates that the apparatus is in an autonomous contention mode and a network device scheduling mode, or is in the network device scheduling mode, sending the assistance information to a network device, wherein the assistance information is utilized for generating a first sidelink transmission resource, and the first sidelink transmission resource is utilized for transmitting sidelink data of the apparatus.

14. The apparatus according to claim 11, wherein that the first sidelink transmission resource is preferentially used or is used only by the apparatus to send the sidelink data to the first terminal device comprises:

a destination terminal device selected based on a sidelink logical channel priority mechanism that comprises the first terminal device.

15. The apparatus according to claim 11, wherein that the first sidelink transmission resource is not used by the apparatus to send the sidelink data to the first terminal device comprises:

a destination terminal device selected based on a sidelink logical channel priority mechanism that does not comprise the first terminal device.

16. The apparatus according to claim 11, wherein the processing of the assistance information based on the mode information of the apparatus comprises: when the mode information indicates that the apparatus is in an autonomous contention mode and a network device scheduling mode, or is in the network device scheduling mode, discarding or ignoring the assistance information.

\* \* \* \* \*